US008174717B2

(12) United States Patent
Tanimoto

(10) Patent No.: US 8,174,717 B2
(45) Date of Patent: May 8, 2012

(54) COMMUNICATION APPARATUS

(75) Inventor: Satoshi Tanimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1108 days.

(21) Appl. No.: 12/037,919

(22) Filed: Feb. 26, 2008

(65) Prior Publication Data

US 2008/0204802 A1 Aug. 28, 2008

(30) Foreign Application Priority Data

Feb. 28, 2007 (JP) .................................. 2007-049276
Mar. 30, 2007 (JP) .................................. 2007-095125

(51) Int. Cl.
G06F 3/12 (2006.01)
G06K 15/00 (2006.01)
G08C 19/16 (2006.01)
G08C 19/12 (2006.01)

(52) U.S. Cl. .................... 358/1.15; 358/1.16; 340/12.51; 340/13.26

(58) Field of Classification Search .................. 348/400, 348/426.16, 442, 439, 453, 474, 296; 358/1.15; 340/995.19, 426.19, 518, 539.1, 545.2, 3.6, 340/4.42, 5.86, 7.42, 12.51, 13.26, 307; 379/100.05, 379/144.04, 289
See application file for complete search history.

(56) References Cited

U.S. PATENT DOCUMENTS

| 5,666,210 A | 9/1997 | Yanai et al. |
| 6,827,279 B2 * | 12/2004 | Teraura .......................... 235/492 |
| 7,000,024 B1 * | 2/2006 | Champagne et al. ......... 709/232 |
| 2005/0105140 A1 * | 5/2005 | Ozaki ........................... 358/402 |
| 2006/0132816 A1 | 6/2006 | Yamamoto et al. |
| 2006/0176510 A1 * | 8/2006 | Nishizawa ................... 358/1.15 |
| 2007/0253022 A1 | 11/2007 | Oshima |

FOREIGN PATENT DOCUMENTS

| JP | 6133100 A | 5/1994 |
| JP | H08-023434 A | 1/1996 |
| JP | H10-093800 A | 4/1998 |
| JP | 2000-138812 A | 5/2000 |
| JP | 2000151957 A | 5/2000 |
| JP | 3182596 B2 | 7/2001 |

(Continued)

OTHER PUBLICATIONS

Takahiro, Facsimile System, Jul. 21, 2005, JP2005198128 (Japanese machine translation), Japanese Patent Application Publication).*

(Continued)

Primary Examiner — Benny Tieu
Assistant Examiner — Ngon Nguyen
(74) Attorney, Agent, or Firm — Baker Botts L.L.P.

(57) ABSTRACT

A communication apparatus includes: a receiving unit which receives reception data transmitted from an external apparatus; an acquiring unit which acquires identification information for identifying the external apparatus which transmits the reception data; and a tag writer which wirelessly write the identification information into a wireless tag.

26 Claims, 17 Drawing Sheets

FOREIGN PATENT DOCUMENTS

| | | | |
|---|---|---|---|
| JP | 2002-337426 | A | 11/2002 |
| JP | 2003-333298 | A | 11/2003 |
| JP | 2005-151357 | A | 6/2005 |
| JP | 2005-198128 | A | 7/2005 |
| JP | 2005198128 | A | 7/2005 |
| JP | 3708227 | B2 | 10/2005 |
| JP | 2006-005442 | A | 1/2006 |
| JP | 2006-103284 | A | 4/2006 |
| JP | 2006-175647 | A | 7/2006 |
| JP | 2006-217298 | A | 8/2006 |
| JP | 2006-306112 | A | 11/2006 |
| JP | 2007-300273 | A | 11/2007 |
| JP | 2008-113325 | A | 5/2008 |

OTHER PUBLICATIONS

Kunio, Communication Syatem, May 16, 2000, JP2000138812 (Japanese machine translation, Japanese Patent Application Publication.*

Japan Patent Office; Notification of Reasons for Refusal in Japanese Patent Application No. 2007-049276 (counterpart to the above-captioned U.S. Patent Application) mailed Mar. 3, 2009.

Japanese Patent Office; Notification of Reasons for Refusal in Japanese Patent Application No. 2007-049276 (counterpart to the above-captioned U.S. patent application) mailed Jun. 2, 2009.

Japan Patent Office, Notification of Reasons for Refusal in counterpart Patent Application No. JP 2007-095125, mailed Jul. 7, 2009.

* cited by examiner

FIG. 3A

20xx xx/xx
XX CORPORATION
MR. ○○○○ ▲ ▲▲

PLEASE ANSWER THE FOLLOWING
QUESTIONS ABOUT □□.

QUESTION 1: ●●●●●●●●

QUESTION 2: ●●●●●●●●

QUESTION 3: ●●●●●●●●
  A: ●●●●●●
  B: ●●●●● page 1

WIRELESS TAG -- 62

FIG. 3B

TO: ○○○○    20xx xx/xx
FROM: ▲ ▲▲

THIS IS A REPLY SHEET TO THE
FOLLOWING FAX RECEIVED ON
20xx xx/xx.

> 20xx xx/xx
> XX CORPORATION
> MR. ○○○○ ▲ ▲▲
>
> PLEASE ANSWER THE FOLLOWING
> QUESTIONS ABOUT □□.
>
> QUESTION 1: ●●●●●●●●
>
> QUESTION 2: ●●●●●●●●
>
> QUESTION 3: ●●●●●●●●
>   A: ●●●●●●
>   B: ●●●●●
>
> page 1

WIRELESS TAG

FOR REPLY TO XXX-XXXX-XXXX

WIRELESS TAG -- 62

FIG. 4A

| MENU | |
|---|---|
| FAX REPLY | |
| REPLY SHEET | COVER PAGE |
| NO WIRELESS TAG RECORDING SHEET | RECORD ON ORDINARY SHEET |

FIG. 4B

| MENU |
|---|
| REPLY SHEET |
| FIRST PAGE OF RECEPTION FAX |
| COVER PAGE |
| BLANK SHEET |
| NOT CREATE |

FIG. 4C

| MENU |
|---|
| NO WIRELESS TAG RECORDING SHEET |
| RECORD ON ORDINARY SHEET |
| RECORD IN MEMORY |

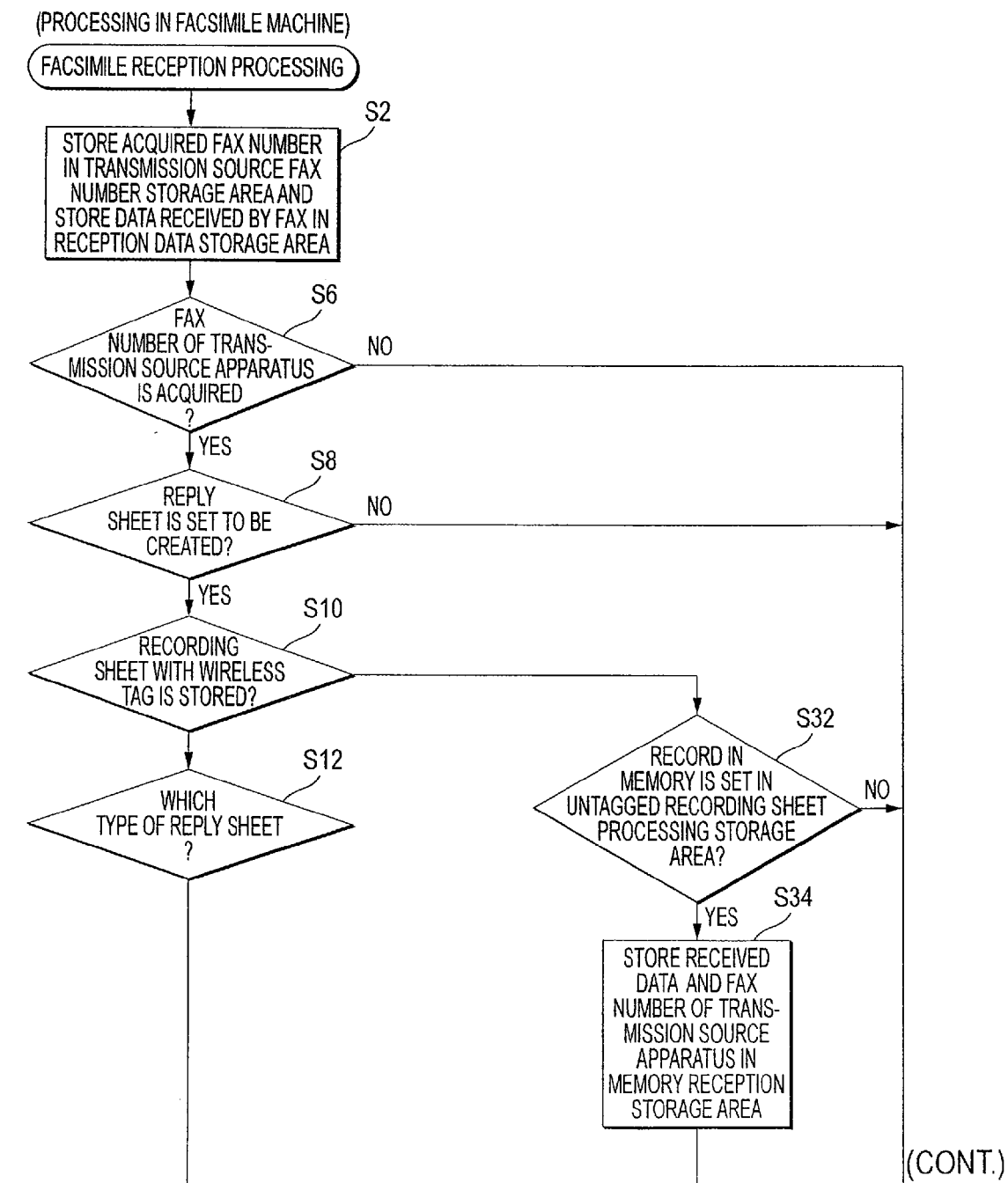

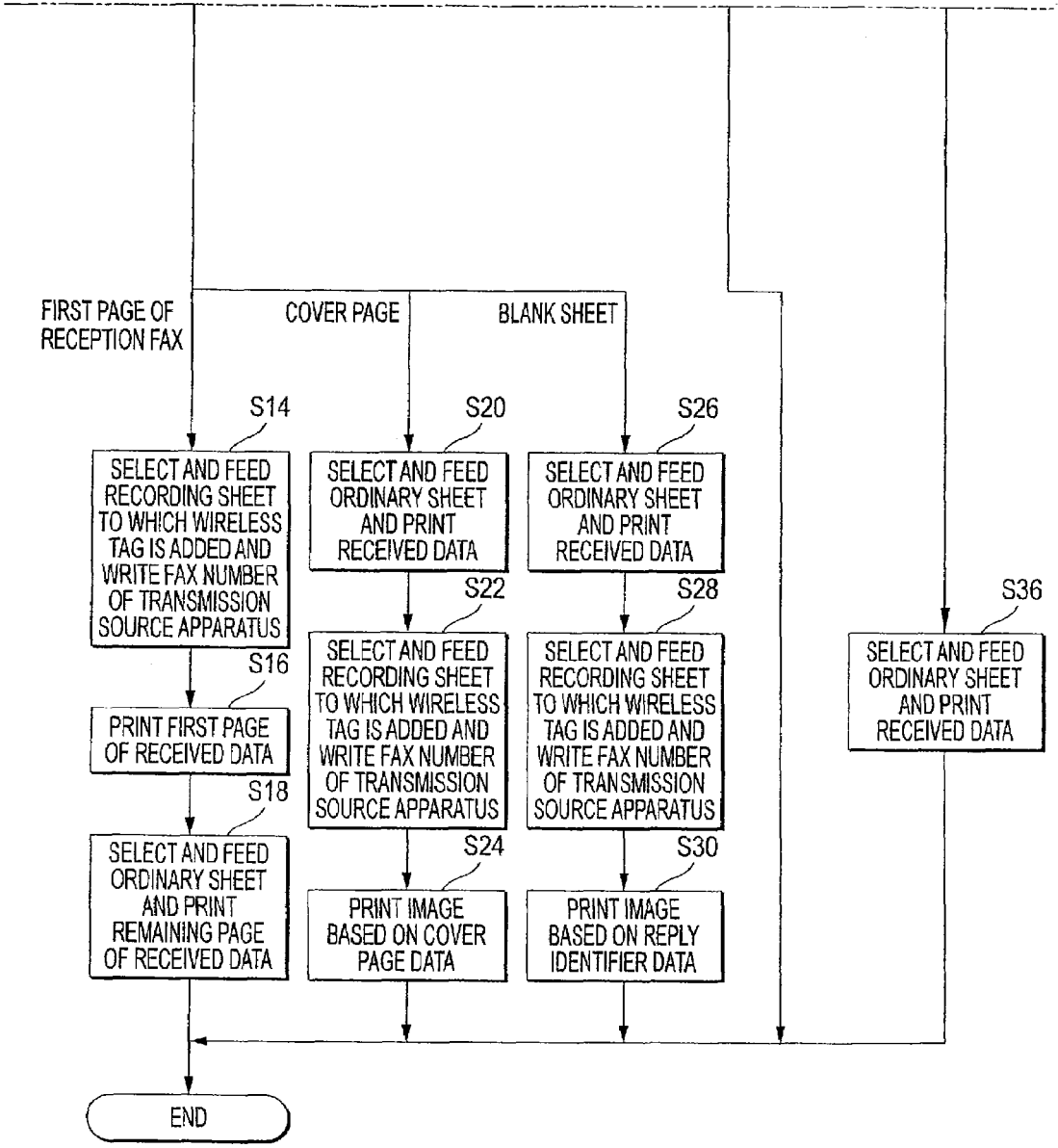

FIG. 8A

DO YOU DIAL THE NUMBER RECORDED
ON THE TAG?

01234567890

DIAL → PRESS 1
NOT DIAL → PRESS 2

FIG. 8B

DO YOU TRANSMIT DOCUMENT
WITH TAG?

01234567890

TRANSMIT → PRESS 1
NOT TRANSMIT → PRESS 2

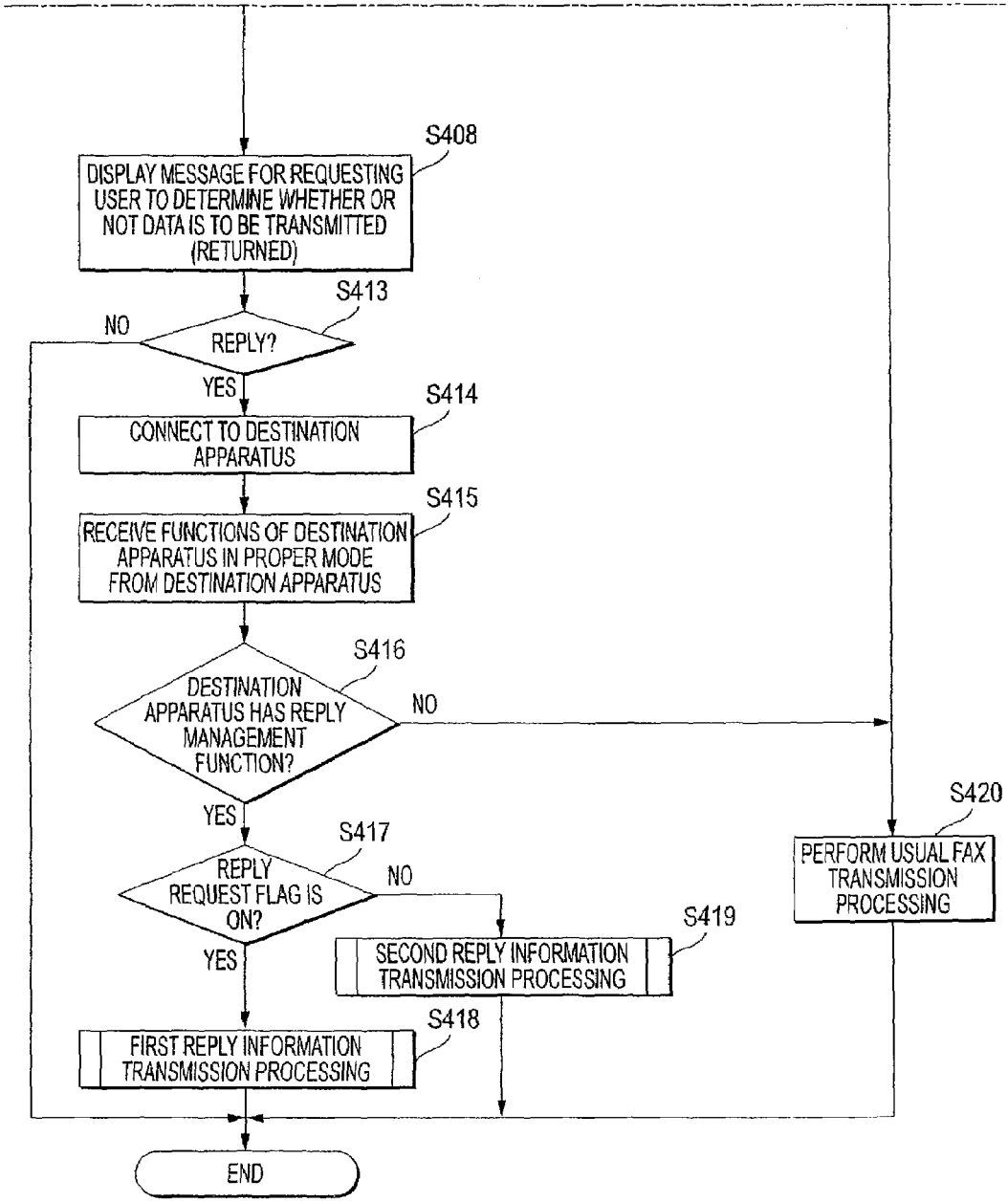

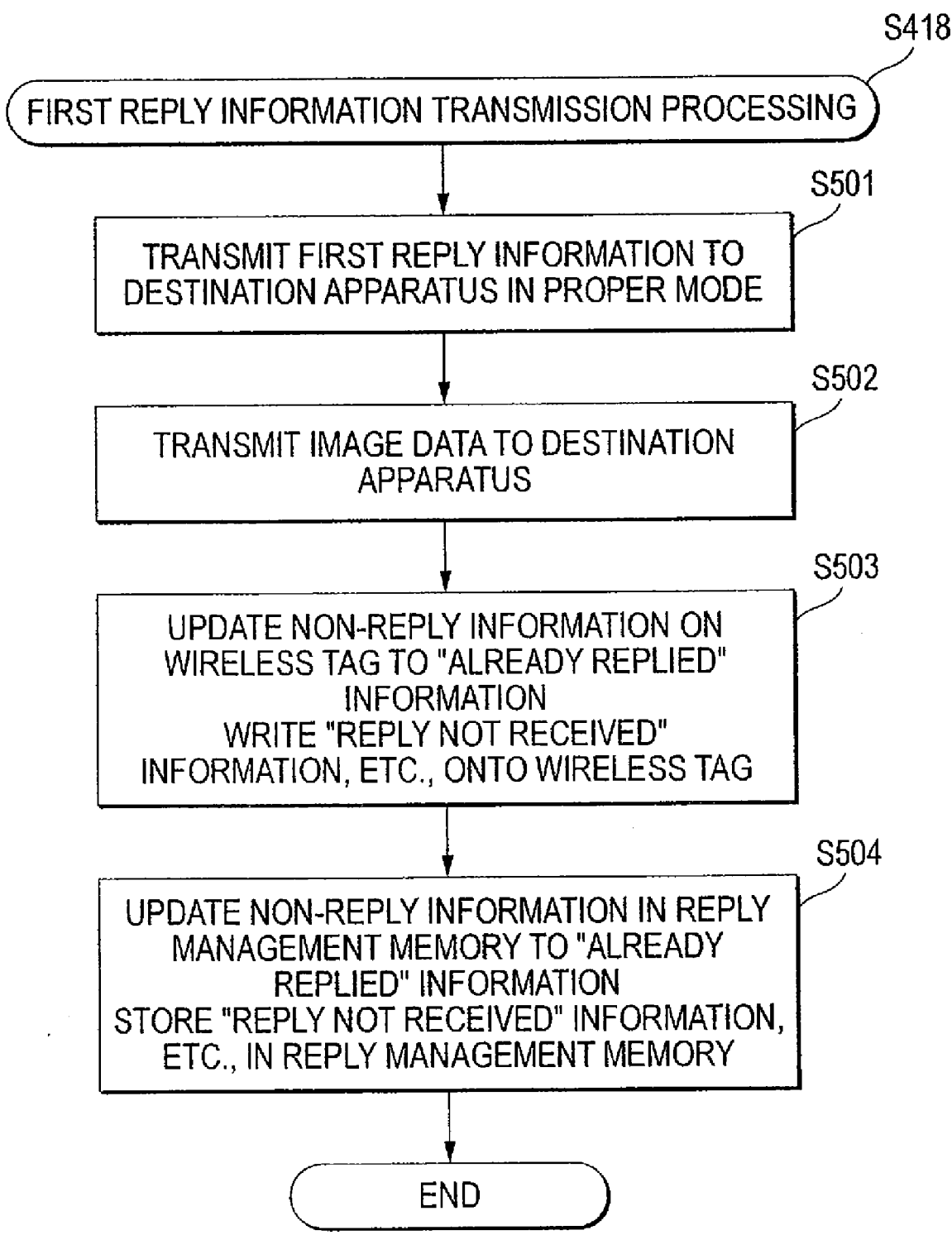

FIG. 15A

| RECEPTION DATE | TRANSMISSION SOURCE | REPLY INFORMATION |
|---|---|---|
| 2007/3/3 15:11 | 1234567890 | 2007/3/8 15:11 DEADLINE |
| 2007/3/4 20:32 | 1234567890 | ALREADY REPLIED |
| 2007/3/6 11:00 | 2345788901 | NON-REPLY |
|  |  |  |

FIG. 15B

| ! THE REPLY TIME LIMIT TO THE FOLLOWING HAS BEEN EXCEEDED: | | |
|---|---|---|
| RECEPTION/ TRANSMISSION DATE | TRANSMISSION SOURCE/DESTINATION | REPLY INFORMATION |
| 2007/2/3 15:11 | 1234567890 | 2007/3/8 15:11 DEADLINE |
|  |  |  |

FIG. 15C

| TRANSMISSION DATE | DESTINATION | REPLY INFORMATION |
|---|---|---|
| 2007/3/1 15:11 | 1234567890 | 2007/3/8 15:11 DEADLINE |
| 2007/3/2 20:32 | 1234567890 | WAIT FOR REPLY |
| 2007/3/3 11:00 | 2345788901 | ALREADY RECEIVED |
|  |  |  |

COMMUNICATION APPARATUS

CROSS-REFERENCE TO RELATED APPLICATION

This application claims priority from Japanese Patent Application No. 2007-049276, filed on Feb. 28, 2007, and Japanese Patent Application No. 2007-095125, filed on Mar. 30, 2007, the entire subject matter of which is incorporated herein by reference.

TECHNICAL FIELD

Aspects of the present invention relate to a communication apparatus and in particular to a communication apparatus capable of making a reply to a transmission source apparatus easily and precisely.

BACKGROUND

A facsimile machine has been known as a communication apparatus which receives data transmitted from a transmission source apparatus, forms an image on a record medium based on the received data, reads an image formed on a record medium, and transmits the read image data to a specified destination apparatus.

As for the facsimile machine, JP-A-2005-198128 describes a facsimile machine which, when receiving facsimile data from a calling party, receives a telephone number and a name of the calling party. Then, if printing of a reply sheet is preset and the telephone number of the calling party is not registered in an abbreviated dialing list, the facsimile machine converts the telephone number and the name of the calling party into a bar code and prints, on a sheet, an image into which the bar code and a first page of the received facsimile data are combined. Also, a pattern indicating the reply sheet "+X>" is printed at the left of the bar code.

In order to reply to the received facsimile data, a user puts the reply sheet on the top of a transmission document at a predetermined position, and then, the transmission document is read. If the pattern "+X>" is detected from the thus read image, the telephone number and the name are displayed on a display based on the bar code. When a user presses a start key, the sheet following the reply sheet is transmitted to the displayed telephone number. Accordingly, a reply can be easily made and a setting error can be suppressed as compared with the case where the telephone number is entered manually.

However, according to the facsimile machine described above, whenever facsimile data is received, a bar code is printed and thus causing consumption of recording sheets and recording agents of ink, toner, etc. Particularly, the bar code is printed visibly on a recording sheet and thus print of the bar code occupies a part of one recording sheet. Therefore, the print on the recording sheet (a received image or an image to be transmitted) could be limited. Further, if a bar code is not clearly printed due to a malfunction of the printer or dirt is deposited on a bar code after print, the telephone number cannot be read from the bar code and after all the telephone number would have to be entered manually.

Further, according to a technique described in JP-A-2005-198128, it could not be certain whether or not facsimile data, to which the reply sheet is not created, requires a reply. Further, a reply state indicating whether or not a reply to the received facsimile data has actually been made and a reply state indicating whether or not a reply has actually been made to the facsimile data having requested a reply, would not certain.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a communication apparatus capable of making a reply to a transmission source apparatus easily and precisely.

Further, it is another aspect of the present invention to provide a communication apparatus capable of facilitating reply operation to reception data and also easily managing the reply state to reception data or transmission data.

According to an exemplary embodiment of the present invention, there is provided a communication apparatus comprising: a receiving unit which receives reception data transmitted from an external apparatus; an acquiring unit which acquires identification information for identifying the external apparatus which transmits the reception data; and a tag writer which wirelessly write the identification information into a wireless tag.

According to another exemplary embodiment of the present invention, there is provided a communication apparatus comprising: an image reading unit which reads image data on a document; a tag reader which wirelessly reads data from a wireless tag; a setting unit which sets identification information for identifying an external apparatus based on the data read by the tag reader; and a transmitting unit which transmits the image data read by the image reading unit to an external apparatus identified by the identification information set by the setting unit.

According to another exemplary embodiment of the present invention, there is provided a communication apparatus comprising: a receiving unit which receives reception data transmitted from an external apparatus; a printing unit which prints an image on a recording medium based on the reception data; and a tag writer which wirelessly writes reply-requested information indicating that a reply to the reception data is requested, into a wireless tag.

According to another exemplary embodiment of the present invention, there is provided a communication apparatus comprising: an image reading unit which reads image data formed on a recording medium; a transmitting unit which transmits a transmission data including the image data read by the image reading unit to an external apparatus; an acquiring unit which acquires reply-requested information indicating that a reply to the transmission data is necessary, into a wireless tag added to the recording medium; a reply management unit which stores, in a storage unit, data identification information for identifying the transmission data and reply-not-received information so as to be associated with each other, the reply-not-received information indicating that a reply to the transmission data identified by the identification information has not been received; and a transmission controller which controls the transmitting unit to transmit the data identifying information and the reply-requested information while being associated with the transmission data to the external apparatus.

According to another exemplary embodiment of the present invention, there is provided a communication apparatus comprising: an image reading unit which reads an image formed on a recording medium; a transmitting unit which transmits transmission data including the image read by the image reading unit, to an external apparatus; a setting unit which is capable of setting that a reply to the transmission data is necessary, a reply management unit which, if the setting unit sets that the reply to the transmission data is necessary, stores in a storage unit, data identification information for identifying the transmission data and reply-not-received information so as to be associated with each other, the reply-not-received information indicating that a reply to the transmission data identified by the identification information has not been received; and a transmission controller which controls the transmitting unit to transmit the data identifying information and the reply-requested information while being associated with the transmission data to the external apparatus.

BRIEF DESCRIPTION OF THE DRAWINGS

The above and other aspects of the present invention will become more apparent and more readily appreciated from the following description of exemplary embodiments of the present invention taken in conjunction with the attached drawings, in which:

FIGS. 3A to 3C are drawings to show examples of reply sheets created in facsimile reception processing according to the first exemplary embodiment of the present invention;

FIGS. 4A to 4C are drawings to show examples of a fax reply setting screen displayed on an operation panel according to the first exemplary embodiment;

FIG. 6 is a flowchart to show facsimile reception processing according to the first exemplary embodiment;

FIGS. 8A and 8B are drawings to show examples of an inquiry screen according to the first exemplary embodiment of the present invention;

FIG. 12 is a flowchart to show first reply information transmission processing according to the second exemplary embodiment;

FIGS. 15A to 15C are drawings to show reply management lists displayed on an LCD.

DETAILED DESCRIPTION

First Exemplary Embodiment

Referring now to the accompanying drawings, a first exemplary embodiment of the present invention will be described.

Figure 1:
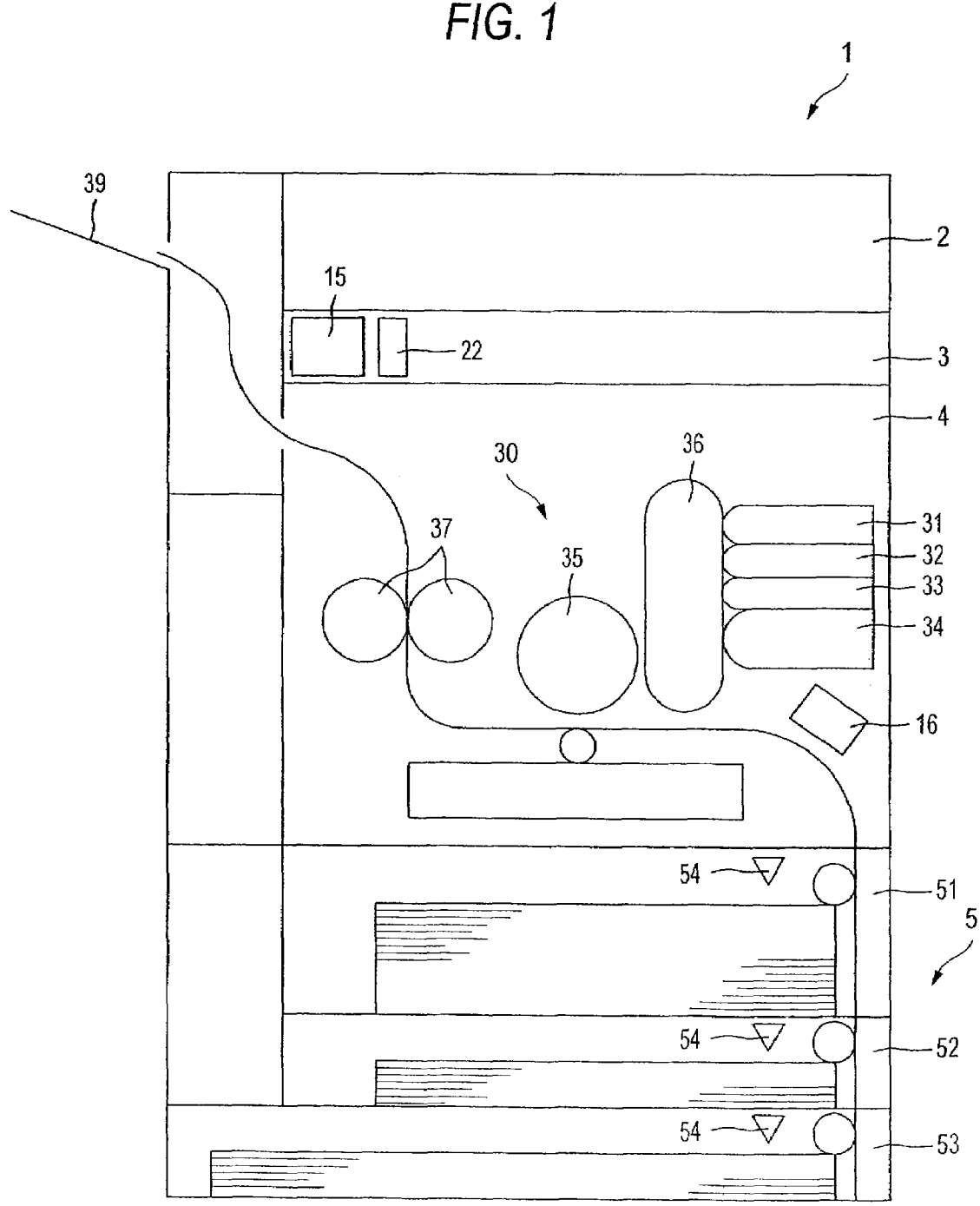
FIG. 1 is a schematic sectional view of a facsimile machine 1 as an example of a communication apparatus according to a first exemplary embodiment of the present invention.

FIG. 1 is a schematic sectional view of a facsimile machine as an example of a communication apparatus according to a first exemplary embodiment of the present invention. A facsimile machine 1 includes an automatic document feeder 2, a scanner unit 3, a printer unit 4, and a sheet feed tray unit 5.

The automatic document feeder 2 includes a document insertion slot (not shown) and a document discharge slot (not shown). The document to be transmitted by fax is inserted into the document insertion slot of the automatic document feeder 2 with the document face pointing downward. When the user presses a start key (not shown), the document is sent one page at a time and the data is read by the scanner unit 3 and then the document is discharged through the document discharge slot.

The scanner unit 3 includes a wireless tag reader 15 and a scanner 22. The wireless tag reader 15 detects whether or not a wireless tag is added to a document sent by the automatic document feeder 2. If a wireless tag is added, the wireless tag reader 15 wirelessly reads data from the wireless tag. The image data of the document sent by the automatic document feeder 2 is read by the scanner 22 regardless of the presence or absence of a wireless tag.

The wireless tag mentioned herein refers to a record medium where data can be read and written in a non-contact manner, also called IC tag or Radio Frequency Identification (RFID) tag. The expression "wireless tag added to a document" means not only a wireless tag put on a document, but also a wireless tag embedded in a document, for example.

The printer unit 4 includes a wireless tag writer 16 and a laser printer 30. The wireless tag writer 16 writes data onto a wireless tag added to a recording sheet fed from the sheet feed tray unit 5 in a wireless manner. The laser printer 30 includes a Y station 31 storing yellow toner, an M station 32 storing magenta toner, a C station 33 storing cyan toner, and a K station 34 storing black toner. The printer unit 4 also includes an intermediate transfer belt 36 for transferring the toner in each station to a transfer drum 35 and a fixing roller 37. A recording sheet on which an image is printed (formed) by the laser printer 30 is discharged to a sheet discharge stacker 39. The printer unit 4 may be an ink jet printer.

The sheet feed tray unit 5 includes three sheet feed trays 51, 52, and 53. Each of the sheet feed trays 51, 52, and 53 is provided with a detection sensor 54 for detecting whether or not a wireless tag is added to each of recording sheets stored in the corresponding sheet feed tray 51, 52, 53 and if a wireless tag is added, detecting the writable capacity of the wireless tag.

To make a facsimile transmission from the facsimile machine 1, when a user sets a document to be transmitted by fax in the automatic document feeder 2 and presses the start key (not shown), the setup document is sent one page at a time. While the document is sent to the read position of the scanner 22, the wireless tag reader 15 provided in the scanner unit 3 detects whether or not a wireless tag is added to the document. If a wireless tag is added, the wireless tag reader 15 reads data from the wireless tag. When the document is sent to a predetermined read position, the image data of the document is read by the scanner 22. Hereinafter, the data read from a wireless tag 62 by the wireless tag reader 15 will be referred to as wireless tag data.

On the other hand, to make a facsimile reception at the facsimile machine 1, the wireless tag writer 16 provided in the printer unit 4 writes data onto a wireless tag added to a recording sheet at a predetermined position in a recording sheet feeding path from the sheet feed tray unit 5 to the image print position of the laser printer 30. The layout relationship among the scanner 22, the wireless tag reader 15, and the wireless tag writer 16 is not limited to the described layout relationship; the components can be laid out in various manners. For example, the wireless tag reader may be provided aside from the move path of a document 61. In this case, a use mode in which information only of wireless tags is precedently read collectively as required is also made possible.

Figure 2:
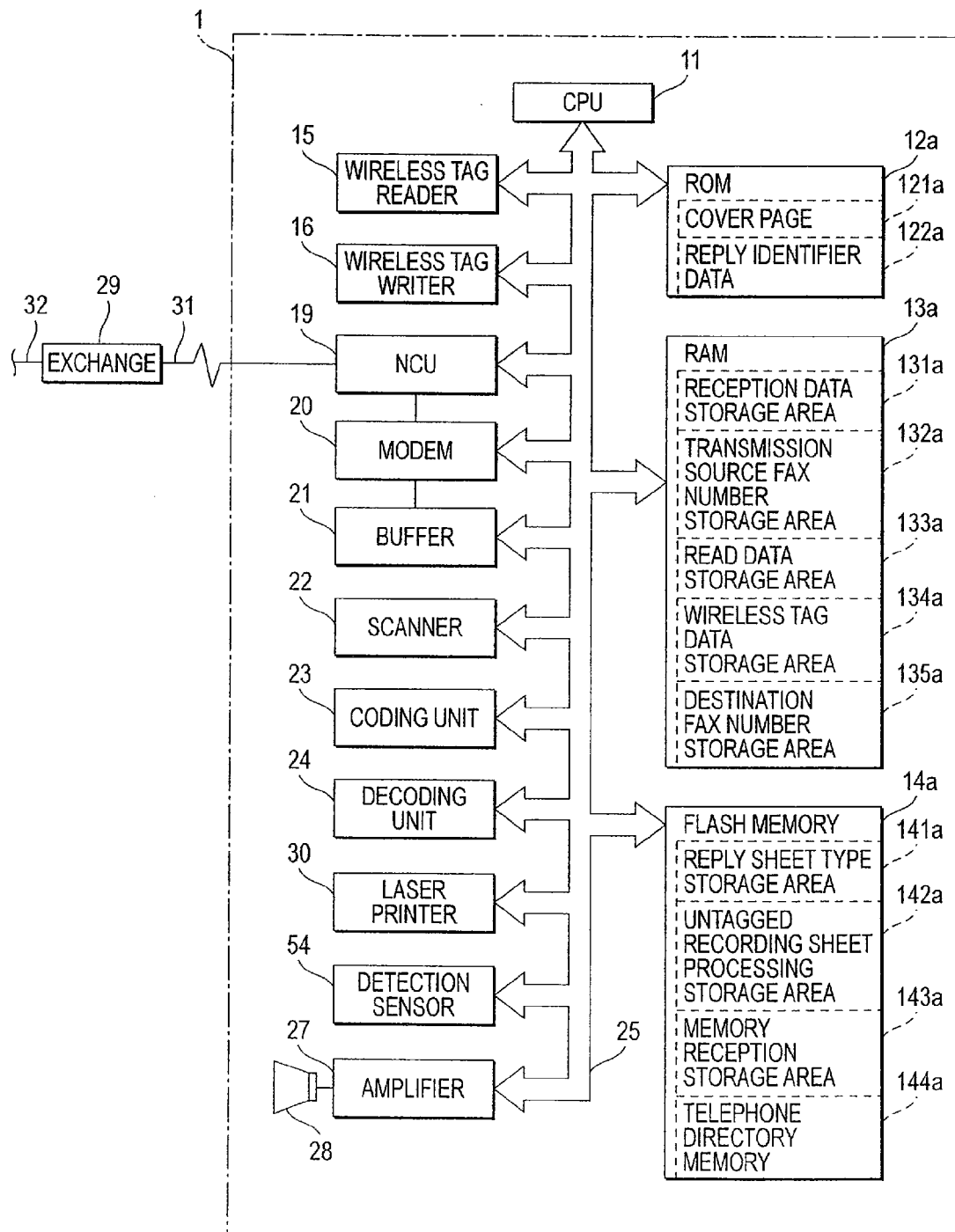
FIG. 2 is a block diagram to show the electric configuration of the facsimile machine according to a first exemplary embodiment of the present invention.

FIG. 2 is a block diagram to show the electric configuration of the facsimile machine 1 according to the first exemplary embodiment of the present invention. The facsimile machine 1 includes a central processing unit (CPU) 11, a read only memory (ROM) 12a, a random access memory (RAM) 13a, flash memory 14a, the wireless tag reader 15, the wireless tag writer 16, a network control unit (NCU) 19, a modem 20, a buffer 21, the scanner 22, a coding unit 23, a decoding unit 24, the laser printer 30, the detection sensors 54, and an amplifier 27, which are connected through a bus line 25.

The CPU 11 of the facsimile machine 1 executes the facsimile operation, namely, data communications by controlling the components connected by the bus line 25 in accordance with various signals transmitted and received through the NCU 19 for performing line control.

The ROM 12a stores control programs executed in the facsimile machine 1 and programs of flowcharts of FIG. 6. Further, the ROM 12a stores cover page data 121a and reply identifier data 122a. The cover page data 121a and the reply identifier data 122a are data used to create a reply sheet in facsimile reception processing (see FIG. 6).

FIGS. 3A to 3C are drawings to show examples of reply sheets created in the facsimile reception processing (see FIG. 6). The reply sheet mentioned here refers to a sheet including a wireless tag into which the FAX number of a transmission source apparatus is written. Such a reply sheet is used as the first page of a reply document, whereby when the document of the first page is read, the FAX number of the transmission source apparatus is read from the wireless tag added to the document and is set as the destination apparatus. Therefore, user's work become easy to perform and a setting mistake can be suppressed as compared with the case where the user enters the FAX number manually.

The facsimile machine 1 of this exemplary embodiment writes the FAX number of the transmission source apparatus into the wireless tag added to a recording sheet to create a reply sheet at the time of the facsimile reception processing (see FIG. 6). This process will be discussed later in detail with reference to FIG. 6.

FIG. 3A is a drawing to show an example wherein the first page printed based on data received by fax is used as a reply sheet. When the first page is printed based on the data received by fax, a reply sheet 59 shown in FIG. 3A is created by writing the FAX number of the transmission source apparatus into the wireless tag 62 added to a recording sheet on which the first page is printed. Accordingly, the recording sheet functions as a reply sheet and also functions as the use of viewing the received data, so that wasteful consumption of recording sheets can be suppressed.

Particularly, if the received data is, for example, a questionnaire and the receiving person enters an answer in the printed sheet in handwriting and returns the sheet as it is by fax, the reply sheet is transmitted by fax. In this case, the FAX number of the transmission source apparatus is automatically set and the objective descriptions can also be transmitted and user's work time and trouble can be decreased. Since the transmission recording sheet and the FAX number of the transmission source apparatus (namely, the reply destination apparatus) are formed in one piece, management is easy to conduct. Hereinafter, the reply sheet 59 will be referred to as "first page of reception fax."

FIG. 3B shows an example of a reply sheet 60 on which a predetermined phrase is printed. In this exemplary embodiment, the reply sheet 60 will be referred to as "cover page."

The cover page 60 shown in FIG. 3B is created by writing the FAX number of the transmission source apparatus into the wireless tag 62 and printing the predetermined phrase based on the cover page data 121a read from the ROM 12a (see FIG. 2).

The cover page 60 shown in FIG. 3B is an example. An image (containing a pattern or text) to allow the user to visually recognize a reply sheet, for example, like a predetermined phase for a reply, is printed, whereby the user can use the cover page 60 as it is as a reply document and user's work time and trouble for creating a reply document can be reduced.

For example, the reception date and time and the user name of the facsimile machine 1 may be embedded in the fixed phrase, as shown in FIG. 3B. In addition to the predetermined phrase, the image of the reception data may be printed on the cover page 60. Accordingly, the transmitting person and the receiving person easily understand what fax the reply is to and management is easy to conduct. The name corresponding to the FAX number written on the wireless tag may be read from telephone directory memory 144a described later and may be printed together.

FIG. 3C is a drawing to show an example of a reply sheet 61 on which reply identifier "For Reply to" is printed. The reply sheet 61 shown in FIG. 3C is created by writing the FAX number of the transmission source apparatus into the wires tag 62 and printing the reply identifier based on the reply identifier data 122a read from the ROM 12a (see FIG. 2).

As shown in FIG. 3C, the FAX number of the transmission source apparatus written on the wireless tag 62 may be printed in addition to the reply identifier. Although the reply sheet 61 shown in FIG. 3C is an example, the reply identifier is printed in a margin of a recording sheet. Accordingly, the recording sheet is provided with a sufficient space which allows a user to make a free entry, and the consumption amount of an image formation material of ink, toner, etc., can also be reduced. Since the reply identifier is printed, the user easily recognizes that the recording sheet is a reply sheet and management is easy to conduct. Hereinafter, the reply sheet 61 will be referred to as "blank sheet."

Returning to FIG. 2, the RAM 13a temporarily stores various pieces of data during execution of the operation of the facsimile machine 1. The RAM 13a includes a reception data storage area 131a, a transmission source FAX number storage area 132a, a read data storage area 133a, a wireless tag data storage area 134a, and a destination FAX number storage area 135a.

The reception data storage area 131a is an area for storing data received by fax through the NCU 19. The transmission source FAX number storage area 132a is an area for storing the FAX number of the transmission source apparatus sent by calling FAX number receiving service (Caller ID) at the time of facsimile reception.

The read data storage area 133a is an area for storing image data read through the scanner 22 at the time of facsimile transmission. The wireless tag data storage area 134a is an area into which the wireless tag data read through the wireless tag reader 15 is written at the time of facsimile transmission. The destination FAX number storage area 135a is an area in which the FAX number of the destination apparatus of the image data read through the scanner 22 is set.

The flash memory 14a is rewritable nonvolatile memory. The flash memory 14a includes a reply sheet type storage area 141a, an untagged recording sheet processing storage area 142$a$, a memory reception storage area 143$a$, and the above-mentioned telephone directory memory 144$a$.

The reply sheet type storage area 141$a$ is an area for storing specification as to which of the three types of reply sheets previously described with reference to FIG. 3 is to be created. The untagged recording sheet processing storage area 142$a$ is an area for storing selection as to what processing is to be performed if a recording sheet to which a wireless tag is added is not stored in the sheet feed tray unit 5. The user enters any desired setting through an operation panel, whereby the user's selection is set in the reply sheet type storage area 141$a$ and the untagged recording sheet processing storage area 142$a$.

Screens displayed on the operation panel will be discussed with reference to FIGS. 4A to 4C. FIG. 4A is a drawing to show an example of a fax reply setting screen 70 displayed on the operation panel. The user selects an item of either REPLY SHEET or NO WIRELESS TAG RECORDING SHEET on the fax reply setting screen 70 shown in FIG. 4A.

FIG. 4B is a drawing to show an example of a reply sheet setting screen 71 displayed on the operation panel if the user selects the item "REPLY SHEET" on the fax reply setting screen 70. The user can set any of "FIRST PAGE OF RECEPTION FAX", "COVER PAGE", "BLANK SHEET", or "NOT CREATE" as the type of reply sheet on the reply sheet setting screen 71 as shown in FIG. 4B. The setting is stored in the reply sheet type storage area 141$a$ (see FIG. 2). If the user sets any type of reply sheet, a wireless tag recording sheet is selected as a reply sheet and the FAX number of the transmission source apparatus is written onto the wireless tag 62. The user may be allowed to make setting of creating a reply cover page on an ordinary recording sheet rather than a wireless tag recording sheet aside from the setting of the reply sheet.

FIG. 4C is a drawing to show an example of a no wireless tag recording sheet setting screen 72 displayed on the operation panel if the user selects the item "NO WIRELESS TAG RECORDING SHEET" on the fax reply setting screen 70. The user can set either "RECORD ON ORDINARY SHEET" or "RECORD IN MEMORY" on the no wireless tag recording sheet setting screen 72 as shown in FIG. 4C.

Although the facsimile machine 1 according to the first exemplary embodiment can be set to write the FAX number of the transmission source apparatus into the wireless tag added to a recording sheet at the time of facsimile reception as described above, only a recording sheet not including a wireless tag can be set in the sheet feed tray unit 5 at the time of facsimile reception. The no wireless tag recording sheet setting screen 72 requests a user to previously make setting as to how data received by fax is to be processed if a recording sheet not including a wireless tag is not set in the sheet feed tray unit 5. The user's setting is stored in the untagged recording sheet processing storage area 142$a$ (see FIG. 2).

If "RECORD ON ORDINARY SHEET" is set in the untagged recording sheet processing storage area 142$a$, the data received by fax is printed out on an ordinary sheet. In the first exemplary embodiment, a recording sheet to which no wireless tag is added is referred to as "ordinary sheet." Accordingly, a reply sheet onto which the FAX number of the transmission source apparatus is written cannot be created, but the user can rapidly view the data received by fax.

On the other hand, if "RECORD IN MEMORY" is set in the untagged recording sheet processing storage area 142$a$, the data received by fax and the FAX number of the transmission source apparatus are stored in the memory reception storage area 143$a$. In so doing, if a recording sheet to which a wireless tag is added is later set in the sheet feed tray unit 5, the data stored in the memory reception storage area 143$a$ can be read and printed as reception data and a reply sheet with a wireless tag into which the FAX number of the transmission source apparatus is written can be created.

Returning to FIG. 2, the telephone directory memory 144$a$ is memory for storing the FAX numbers and the names corresponding to the FAX numbers in advance.

The wireless tag reader 15 reads data from a wireless tag, and the wireless tag writer 16 writes data onto a wireless tag.

Figure 5A:
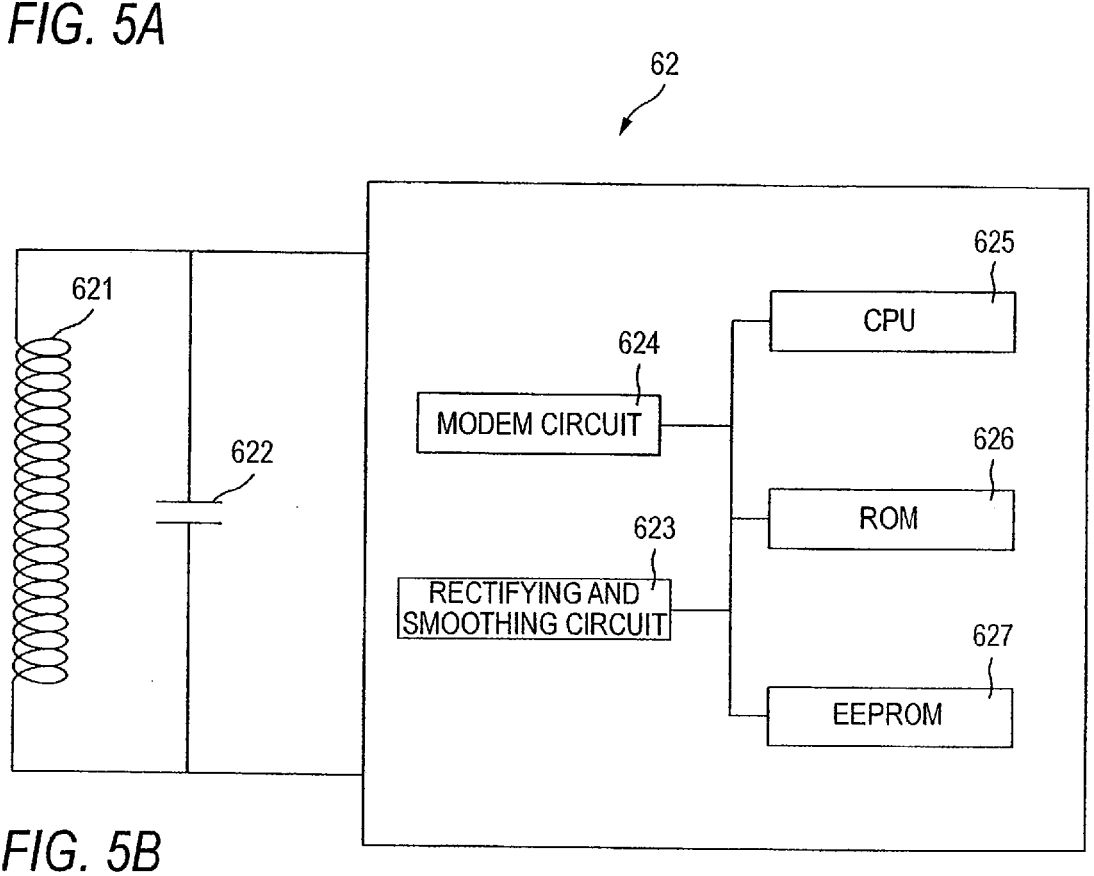
FIG. 5A is a schematic block diagram to show the electric configuration of a wireless tag according to embodiments of the present invention.

The wireless tag 62, the wireless tag reader 15, and the wireless tag writer 16 will be discussed with reference to FIGS. 5A and 5B. FIG. 5A is a schematic block diagram to show the electric configuration of the wireless tag 62. As shown in FIG. 5A, the wireless tag 62 includes an antenna coil 621, a resonant capacitor 622, a rectifying and smoothing circuit 623, a modem circuit 624, a CPU 625, a ROM 626, and an electrically erasable programmable read only memory (EEPROM) 627. The antenna coil 621 is connected in parallel with the resonant capacitor 622 to form a resonance circuit for receiving power radio wave vibration of a predetermined high frequency transmitted from the wireless tag reader 15 or the wireless tag writer 16 and supplying it to the rectifying and smoothing circuit 623.

The rectifying and smoothing circuit 623, which forms a power supply circuit, rectifies and smoothes the power radio wave signal transmitted from the resonance circuit to generate DC power of a given voltage, and supplies it to the CPU 625, etc.

The signal transmitted from the wireless tag reader 15 or the wireless tag writer 16 is superposed on the power radio wave signal for transmission, and the signal is demodulated by the modem circuit 624 and the signal is fed into the CPU 625.

The CPU 625 operates in accordance with an operation program stored in the ROM 626, executes processing responsive to the signal input from the modem circuit 624, writes received data into the EEPROM 627, reads data from the EEPROM 627, demodulates the data by the modem circuit 624, and transmits the result as a radio wave signal from the antenna coil 621.

In the wireless tag 62, the rectifying and smoothing circuit 623, the modem circuit 624, the CPU 625, the ROM 626, and the EEPROM 627 are integrated into one IC chip, which is embedded in a recording sheet together with the antenna coil 621.

Figure 5B:
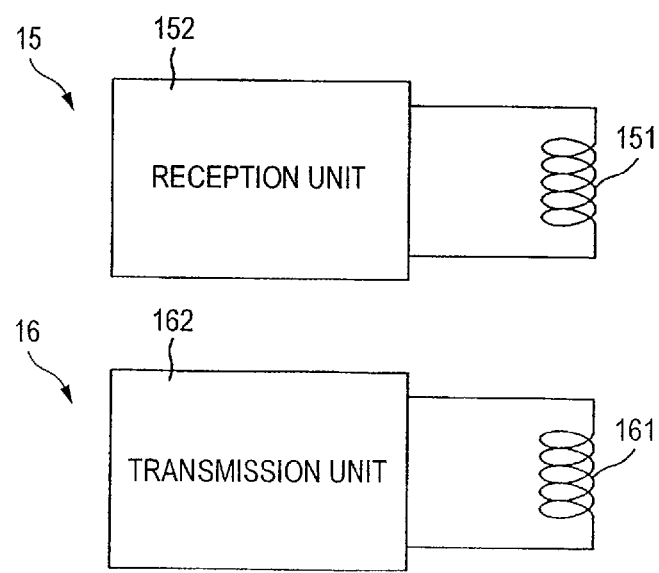
FIG. 5B is a schematic block diagram to show the electric configuration of a wireless tag reader and a wireless tag writer according to exemplary embodiments of the present invention.

FIG. 5B is a schematic block diagram to show the electric configuration of the wireless tag reader 15 and the wireless tag writer 16. As shown in FIG. 5B, the wireless tag reader 15 includes a reception unit 152 provided with a reception antenna coil 151. The wireless tag writer 16 includes a transmission unit 162 provided with a transmission antenna coil 161.

The wireless tag reader 15 receives a radio wave signal transmitted from the wireless tag 62 at the reception antenna coil 151, demodulates the signal in the reception unit 152, and discriminates the signal to be wireless tag data. The wireless tag data can be thus read from the wireless tag 62.

The wireless tag writer 16 modulates a carrier signal in the transmission unit 162 and transmits the signal from the transmission antenna coil 161 as a power radio wave signal and then modulates the wireless tag data to be transmitted so as to superpose the data on the power radio wave signal in the transmission unit 162, and transmits the data signal from the transmission antenna coil 161. The wireless tag data can be thus written onto the wireless tag 62.

Returning to FIG. 2, the modem 20 modulates and demodulates facsimile data 63 for transmission and also transmits and receives various protocol signals for transmission control, and the buffer 21 temporally stores data containing coded facsimile data transmitted to and received from another facsimile machine.

The coding unit 23 codes the facsimile data 63. The decoding unit 24 reads and decodes the reception data stored in the buffer 21. A speaker 28 is connected to the amplifier 27 for outputting a ring tone, etc., from the speaker 28.

The facsimile machine 1 is connected to a telephone line 31 through the NCU 19. The telephone line 31 is connected to an exchange 29 of the facsimile machine 1 and the exchange 29 is connected to an exchange of another machine through a telephone line 32 and further is connected to the other machine.

Next, facsimile reception processing according to the first exemplary embodiment executed in the facsimile machine 1 described above will be discussed with reference to FIG. 6. FIG. 6 is a flowchart to show the facsimile reception processing according to the first exemplary embodiment of the present invention. The facsimile reception processing shown in FIG. 6 shows processing after data communications with a transmission source apparatus (not shown) are started.

Firstly, if the FAX number of the transmission source apparatus is acquired, the acquired FAX number is stored in the transmission source FAX number storage area 132a and the data received by fax is stored in the reception data storage area 131a (see FIG. 2) (S2).

Next, it is determined whether or not the FAX number of the transmission source apparatus is acquired (S6). If the FAX number of the transmission source apparatus is acquired (YES at S6), it is checked whether or not a reply sheet is set to be created with reference to the reply sheet type storage area 141a (S8).

If creating a reply sheet is set (YES at S8), then it is determined whether or not a recording sheet to which a wireless tag is added is stored in the sheet feed tray unit 5 (S10) according to whether or not the detection sensor 54 (see FIG. 1) detects a wireless tag.

If a recording sheet to which a wireless tag is added is stored (YES at S10), then it is checked which type of reply sheet is to be created with reference to the reply sheet type storage area 141a (S12).

If "FIRST PAGE OF RECEPTION FAX" is set in the reply sheet type storage area 141a (FIRST PAGE OF RECEPTION FAX at S12), one recording sheet to which a wireless tag is added is selected and is fed and the FAX number of the transmission source apparatus stored in the transmission source FAX number storage area 132a is written into the wireless tag of the recording sheet (S14). The recording sheet is conveyed to the print position of the laser printer 30 and the first page of the received data is printed (S16). Next, an ordinary sheet(s) is selected and is fed and the remaining page of the received data is printed (S18) and the processing ends. Accordingly, the FAX number of the transmission source apparatus can be written into the wireless tag added to the recording sheet of the first page of the recording sheets on which images based on the received data are printed. Then, the reply sheet 59 shown in FIG. 3A can be created.

If "COVER PAGE" is set in the reply sheet type storage area 141a (COVER PAGE at S12), an ordinary sheet(s) is selected and is fed and the received data is printed (S20). One recording sheet to which a wireless tag is added is selected and is fed and the FAX number of the transmission source apparatus stored in the transmission source FAX number storage area 132a is written into the wireless tag of the recording sheet (S22). The recording sheet with the wireless tag is conveyed to the print position of the laser printer 30 and an image based on the cover page data 121a (see FIG. 2) is printed (S24) and the processing ends. Accordingly, a predetermined reply phrase is printed on a reply sheet and the FAX number of the transmission source apparatus can be written into the wireless tag added to the reply sheet to create the cover page 60 shown in FIG. 3B.

If "BLANK SHEET" is set in the reply sheet type storage area 141a (BLANKSHEET at S12), an ordinary sheet(s) is selected and is fed and the received data is printed (S26). Then, one recording sheet to which a wireless tag is added is selected and is fed and the FAX number of the transmission source apparatus stored in the transmission source FAX number storage area 132a is written into the wireless tag of the recording sheet (S28). The recording sheet is further conveyed to the print position of the laser printer 30 and an image based on the reply identifier data 122a (see FIG. 2) is printed (S30) and the processing ends. Accordingly, a reply sheet on which a reply identifier is printed can be printed and the FAX number of the transmission source apparatus can be written into the wireless tag added to the reply sheet to create the replay sheet 61 shown in FIG. 3C.

On the other hand, if the FAX number of the transmission source apparatus cannot be acquired (NO at S6) or if a reply sheet is set to be not created (NO at S8), an ordinary sheet(s) is selected and is fed and the received data is printed (S36). Accordingly, use of an expensive recording sheet to which a wireless tag is added can be saved. If a user selects setting of "NOT CREATE" in advance, writing of an unnecessary FAX number for the user into a wireless tag can be suppressed.

If a recording sheet to which a wireless tag is added is not stored in the sheet feed tray unit 5 (NO at S10), the untagged recording sheet processing storage area 142a is checked and the setting therein is determined (S32). If "RECORD IN MEMORY" is set in the untagged recording sheet processing storage area 142a (YES at S32), the data received by fax and the FAX number of the transmission source apparatus are stored in the memory reception storage area 143a (see FIG. 2) (S34) and the processing ends.

On the other hand, if "RECORD ON ORDINARY SHEET" is stored in the untagged recording sheet processing storage area 142a (NO at S32), an ordinary sheet(s) is selected and is fed and the received data is printed (S36) and the processing ends. Accordingly, even when a recording sheet to which a wireless tag is added is not stored, the user can visually recognize the received data rapidly.

According to the facsimile reception processing of the first exemplary embodiment, some image is printed on a recording sheet with a wireless tag into which the FAX number of the transmission source apparatus is written, for example, as shown in FIGS. 3A to 3C. Therefore, a user can easily determine that the recording sheet is added with a wireless tag into which the FAX number of the transmission source apparatus is written. Additionally, the wireless tag into which the FAX number of the transmission source apparatus is written is hard to lose and management is easy to conduct.

Since a recording sheet to which a wireless tag is added is selected only as a recording sheet to create a reply sheet, use of an expensive record medium to which a wireless tag is added can be saved.

Figure 7:
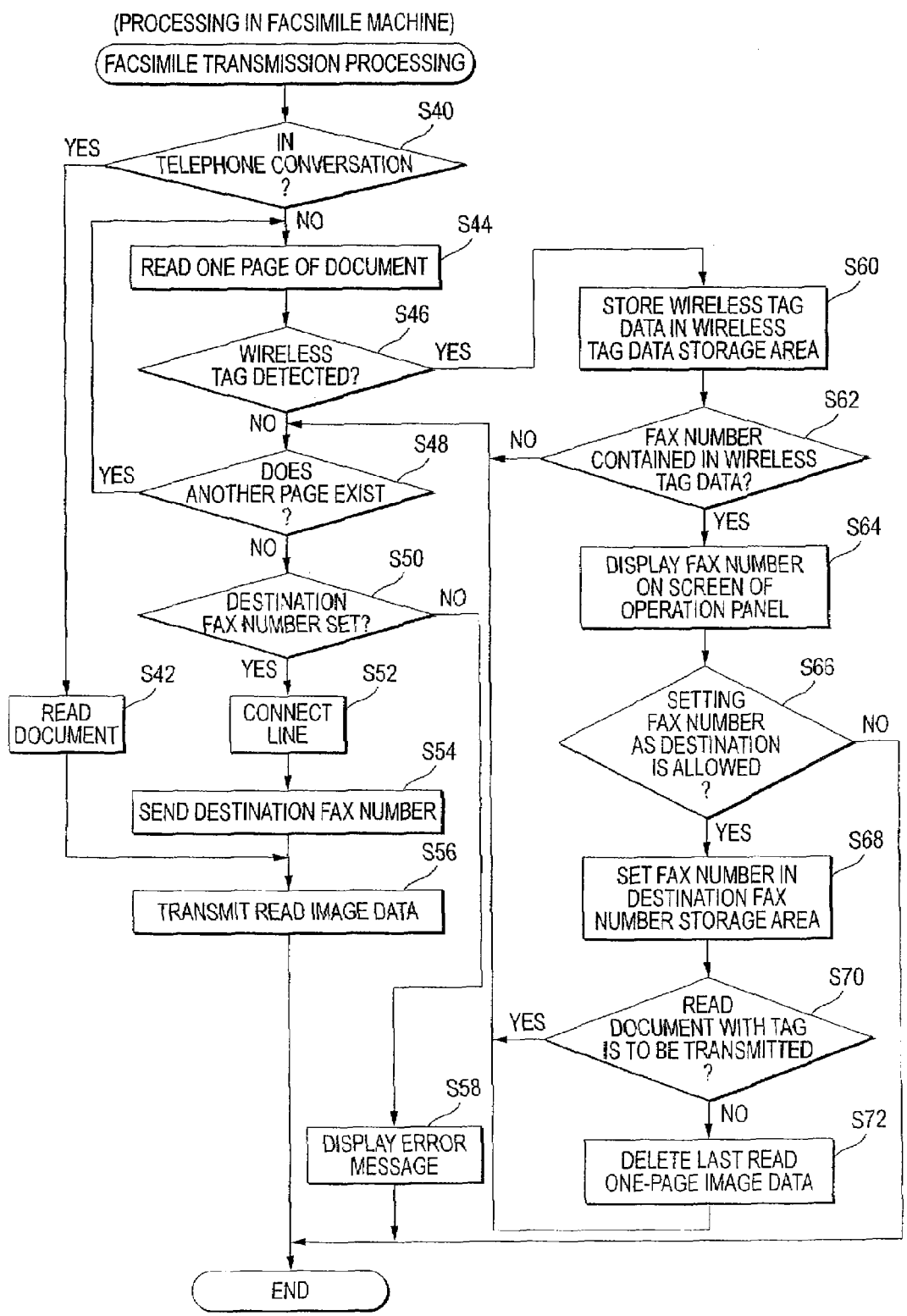
FIG. 7 is a flowchart to show facsimile transmission processing according to the first exemplary embodiment.

Next, facsimile transmission processing according to the first exemplary embodiment executed in the facsimile machine 1 will be discussed with reference to FIG. 7. FIG. 7 is a flowchart to show the facsimile transmission processing according to the first exemplary embodiment of the present invention. The facsimile transmission processing is processing executed when the user sets a document in the document insertion slot of the automatic document feeder 2 and presses the start key (not shown) to issue a facsimile transmission processing command. If the FAX number of a destination apparatus is input before the start key is pressed, the input FAX number is set in the destination FAX number storage area 135*a* (see FIG. 2).

Firstly, it is determined whether or not a user of the facsimile machine 1 is in telephone conversation with another apparatus using the telephone function of the facsimile machine 1 (S40). If a facsimile transmission processing command is issued during the telephone conversation with the other apparatus (YES at S40), the image data of a document is read through the scanner 22 (S42) and the read image data is transmitted to the other apparatus of the telephone conversation (S56) and the processing ends.

On the other hand, if a user of the facsimile machine 1 is not in telephone conversation with another apparatus (NO at S40), then one page of a document is fed and conveyed and one page of the image data is read through the scanner 22, while detecting a wireless tag added to the document by the wireless tag reader 15. Then the read image data is stored in the read data storage area 133*a* (S44).

Additionally, it is determined whether or not a wireless tag is detected by the wireless tag reader 15 while the document is conveyed (S46). If a wireless tag is detected (YES at S46), the wireless tag data is read and is stored in the wireless tag data storage area 134*a* (see FIG. 2) (S60). Next, it is determined whether or not the read wireless tag data contains a FAX number (S62).

If the read wireless tag data contains a FAX number (YES at S62), the FAX number is displayed on a screen of the operation panel (S64) and a message is displayed inquiring of a user whether or not the user allows the FAX number to be set as the destination (S66).

FIG. 8A shows an example of an inquiry screen for inquiring of a user whether or not the user allows the FAX number to be set as the destination. As shown in FIG. 8A, the FAX number written on the wireless tag is displayed on the operation panel and a way to make setting as to whether or not transmission to the FAX number is allowed is displayed together, thereby enabling the user to easily perform response operation. The name corresponding to the displayed FAX number may be read from the telephone directory memory 144*a* (see FIG. 2) and may be displayed together.

Returning to FIG. 7, if the user allows the FAX number to be set as the destination in response to the inquiry (YES at S66), the FAX number read as the wireless tag data is set in the destination FAX number storage area 135*a* (see FIG. 2) (S68).

On the other hand, if the user does not allow the FAX number to be set as the destination in response to the inquiry (NO at S66), the facsimile transmission processing ends. Accordingly, it can be suppressed that an erroneous FAX number is set as the destination while a user does not aware of it.

Next, a message is displayed inquiring of a user whether or not the document to which the wireless tag is added is to be transmitted (S70). FIG. 8B shows an example of an inquiry screen for inquiring of a user whether or not the document to which the wireless tag is added is to be transmitted. The facsimile machine 1 thus inquires of the user whether or not read image of a document is to be transmitted for a document to which the wireless tag is added, one by one, whereby whether or not the document is to be transmitted can be determined for each page.

Returning to FIG. 7, if the user selects no transmission of the document to which the wireless tag is added (NO at S70), the last read one-page image data is deleted from the read data storage area 133*a* (see FIG. 2) (S72) and the processing proceeds to S48. That is, if the recording sheet is a sheet only used to set the FAX number of the destination and does not have image data to be transmitted to the destination, the image data is erased. Accordingly, transmission of an unnecessary page for the destination apparatus can be prevented.

On the other hand, if a user selects transmission of the document to which the wireless tag is added (YES at S70), operation S72 is skipped and the process goes to S48. If the read wireless tag data does not contain a FAX number (NO at S62), the process also proceeds to S48.

Then, it is determined whether or not another page exists (S48). If another page exists (YES at S48), the process returns to S44 and read processing of the document of the page is repeated.

While the processing is thus repeated, if it is determined that another page does not exist (NO at S48), it is determined whether or not the FAX number of the destination is set in the destination FAX number storage area 135*a* (see FIG. 2) (S50). If the FAX number of the destination is not set (NO at S50), an error message is displayed (S58) and the processing ends.

On the other hand, if the FAX number of the destination is set (YES at S50), the line is connected (S52), the set destination FAX number is sent (S54), the read image data is read from the read data storage area 133*a* and is transmitted (S56), and the processing ends.

According to the facsimile transmission processing of the first exemplary embodiment, the FAX number of the destination can be set more easily and precisely as compared with the case where a user enters the FAX number of the destination apparatus manually.

If it is determined that the wireless tag data contains the FAX number of the destination apparatus, the FAX number is set, so that setting of erroneous data can be suppressed.

While the present invention has been shown and described with reference to the first exemplary embodiment thereof, it will be understood by those skilled in the art that various changes in form and details may be made therein without departing from the spirit and scope of the invention as defined by the appended claims.

For example, the facsimile machine 1 of the first exemplary embodiment described above contains the wireless tag reader 15, the wireless tag writer 16, the scanner 22, and the laser printer 30 all as internal components, but the components may be external components connected to the facsimile machine 1 through a cable, etc.

In the description of the facsimile machine 1 of the first exemplary embodiment, the image data of the document 61 is read through the automatic document feeder 2, but the inventive concept can also be applied to a facsimile machine for reading image data using a flat bed system.

If a recording sheet without wireless tag is not stored in the sheet feed tray unit 5, a recording sheet to which a wireless tag of the minimum storage capacity is added may be selected among the recording sheets stored in the sheet feed tray unit 5, in stead.

A predetermined image printed on a reply sheet may be an image containing a format for a user to enter information in a handwriting manner. In other words, the predetermined image may be a prompt which prompts writing data. That is, blank fields in which the user can enter item names which are frequently described on the top page of a transmission document, such as the transmission date, the name of the person in charge, and the number of transmission pages may be printed.

With this configuration, a user can enter any desired information in a default format in a handwriting manner to easily create a recording sheet.

Second Exemplary Embodiment

Figure 9:
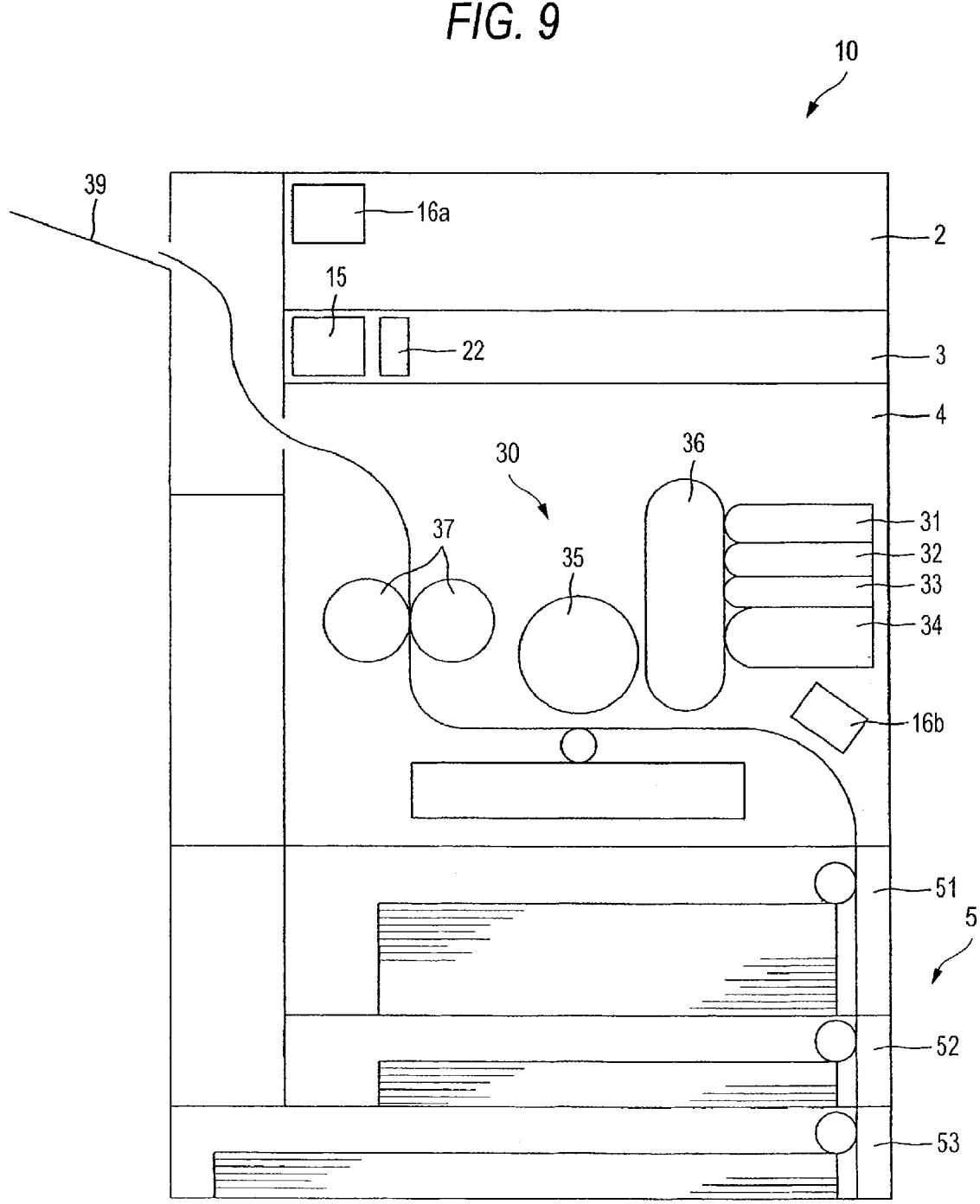
FIG. 9 is a schematic sectional view of a facsimile machine 1 as an example of a communication apparatus according to a second exemplary embodiment of the present invention.

Next, a second exemplary embodiment of the present invention will be described. In the following, components which are the same as those in the first exemplary embodiment are denoted by same reference numerals, and descriptions thereof will be omitted. FIG. 9 is a schematic sectional view of a facsimile machine as an example of a communication apparatus according to a second exemplary embodiment. A facsimile machine 10 can manage the reply state to FAX data as to whether or not a reply to received FAX data has been made, whether or not a reply to transmitted FAX data has been received, etc.

As shown in FIG. 9, the facsimile machine 10 according to the second exemplary embodiment includes an automatic document feeder 2, a scanner unit 3, a printer unit 4, and a sheet feed tray unit 5.

As shown in FIG. 9, the facsimile machine 10 according to the second exemplary embodiment is provided with wireless tag writers 16a and 16b instead of the wireless tag 16 in the facsimile machine 1 according to the first exemplary embodiment. The wireless tag writer 16a is included in the automatic document feeder 2. The wireless tag writer 16a writes data onto a wireless tag attached to the document which is read by the scanner unit 3 and discharged through the document discharge slot of the scanner unit 3, in a wireless manner. The wireless tag writer 16b is included in the printer unit 4. The wireless tag writer 16b writes data onto a wireless tag added to a recording sheet fed from the sheet feed tray unit 5 in a wireless manner.

To make a facsimile transmission from the facsimile machine 10, when a user sets a document to be transmitted by fax in the automatic document feeder 2 and presses the start key (not shown), the setup document is sent one page at a time. While the document is sent to the read position of the scanner 22, the wireless tag reader 15 provided in the scanner unit 3 detects whether or not a wireless tag is added to the document. If a wireless tag is added, the wireless tag reader 15 reads data from the wireless tag. When the document is sent to a predetermined read position, the image data of the document is read by the scanner 22. Hereinafter, the data read from a wireless tag 62 by the wireless tag reader 15 will be referred to as wireless tag data. Then, the wireless tag writer 16a writes data onto the wireless tag added to the document discharged to the document discharge slot.

On the other hand, to make a facsimile reception at the facsimile machine 10, the wireless tag writer 16b provided in the printer unit 4 writes data onto a wireless tag added to a recording sheet at a predetermined position in a recording sheet feeding path from the sheet feed tray unit 5 to the image print position of the laser printer 30. The layout relationship among the scanner 22, the wireless tag reader 15, and the wireless tag writers 16a and 16b is not limited to the described layout relationship; the components can be laid out in various manners. For example, the wireless tag reader may be provided aside from the document move path. In this case, a use mode in which information only of wireless tags is precedently read collectively as required is also made possible.

Figure 10:
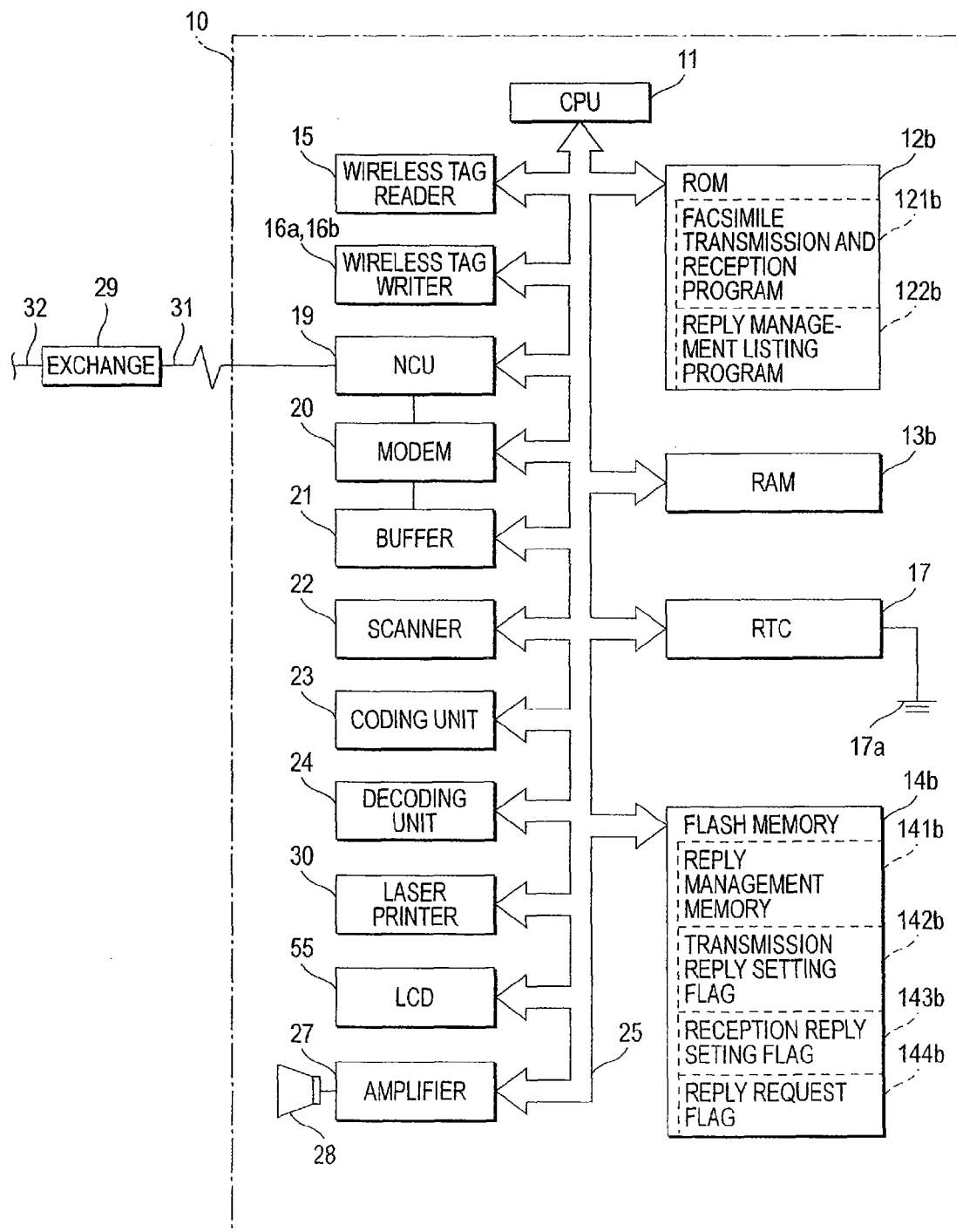
FIG. 10 is a block diagram to show the electric configuration of the facsimile machine.

FIG. 10 is a block diagram to show the electric configuration of the facsimile machine 10 according to the second exemplary embodiment. The facsimile machine 10 includes a central processing unit (CPU) 11, a read only memory (ROM) 12b, a random access memory (RAM) 13b, a flash memory 14b, an RTC 17, the wireless tag reader 15, the wireless tag writers 16a and 16b, a network control unit (NCU) 19, a modem 20, a buffer 21, the scanner 22, a coding unit 23, a decoding unit 24, the laser printer 30, a liquid crystal display (LCD) 55, and an amplifier 27, which are connected through a bus line 25.

The CPU 11 of the facsimile machine 10 executes the facsimile operation, namely, data communications by controlling the components connected by the bus line 25 in accordance with various signals transmitted and received through the NCU 19 for performing line control.

The ROM 12b stores control programs executed in the facsimile machine 10. Particularly, the ROM 12b stores a facsimile transmission and reception program 121b and a reply management listing program 122b. The facsimile transmission and reception program 121b is a program for executing flowcharts of FIGS. 11 to 14. The reply management listing program 122b is a program for displaying a reply management list shown in FIGS. 15A to 15C on the LCD 55. The RAM 13b is memory for temporarily storing various pieces of data during execution of the operation of the facsimile machine 10.

The flash memory 14b is rewritable nonvolatile memory. The flash memory 14b includes a reply management memory 141b, a transmission reply setting flag 142b, a reception reply setting flag 143b, and a reply request flag 144b.

The reply management memory 141b is memory for storing information to execute management as to whether or not a reply has been made or as to whether or not a reply has been received for each received facsimile data and transmitted facsimile data. The reply management memory 141b stores reception date and time data, transmission source identification information, reply information and time limit information while being associated with one another. The reception date and time data serves as identification information for identifying received facsimile data. The transmission source identification information indicates the FAX number of the transmission source transmitting the received facsimile data. The reply information indicates whether or not a reply has been made to the received facsimile data. The time limit information indicates the reply time limit.

The transmission reply setting flag 142b is a flag for a user to make presetting as to whether or not a reply request is to facsimile data is to be sent to the destination apparatus when transmitting the facsimile data. To make a reply request, the flag is preset to ON. A user can set the transmission reply setting flag 142b by operating a predetermined key or operating a menu screen (e.g., setting units).

The reception reply setting flag 143b is a flag for a user to make presetting as to whether or not a reply is to be made to the transmission source apparatus transmitting the facsimile data when receiving facsimile data. To make a reply, the flag is preset to ON. A user can set the reception reply setting flag 143b by operating a predetermined key or operating a menu screen.

The reply request flag 144b is a flag set to ON if the transmission reply setting flag 142b is set to ON or if reply request information is written onto the wireless tag added to the document to be transmitted. Upon completion of transmitting the document, the flag is set to OFF.

The RTC 17 is a chip for clock and a battery 17a is connected to the RTC 17 so that the RTC 17 can be started even while power is turned off. From the RTC 17, the current date and time and the transmission date and time and the reception date and time of facsimile data can be detected.

The wireless tag reader 15 reads data from a wireless tag, and the wireless tag writers 16a and 16b write data onto a wireless tag in the same manner as those in the first exemplary embodiment.

Returning to FIG. 10, the modem 20 modulates and demodulates facsimile data 63 for transmission and also transmits and receives various protocol signals for transmission control, and the buffer 21 temporally stores data containing coded facsimile data transmitted to and received from an associated facsimile machine.

The coding unit 23 codes the facsimile data 63. The decoding unit 24 reads and decodes the reception data stored in the buffer 21. A speaker 28 is connected to the amplifier 27 for outputting a ring tone, etc., from the speaker 28.

The facsimile machine 10 is connected to a telephone line 31 through the NCU 19. The telephone line 31 is connected to an exchange 29 of the facsimile machine 10 and the exchange 29 is connected to an exchange of another machine through a telephone line 32 and further is connected to the other machine.

Figure 11:
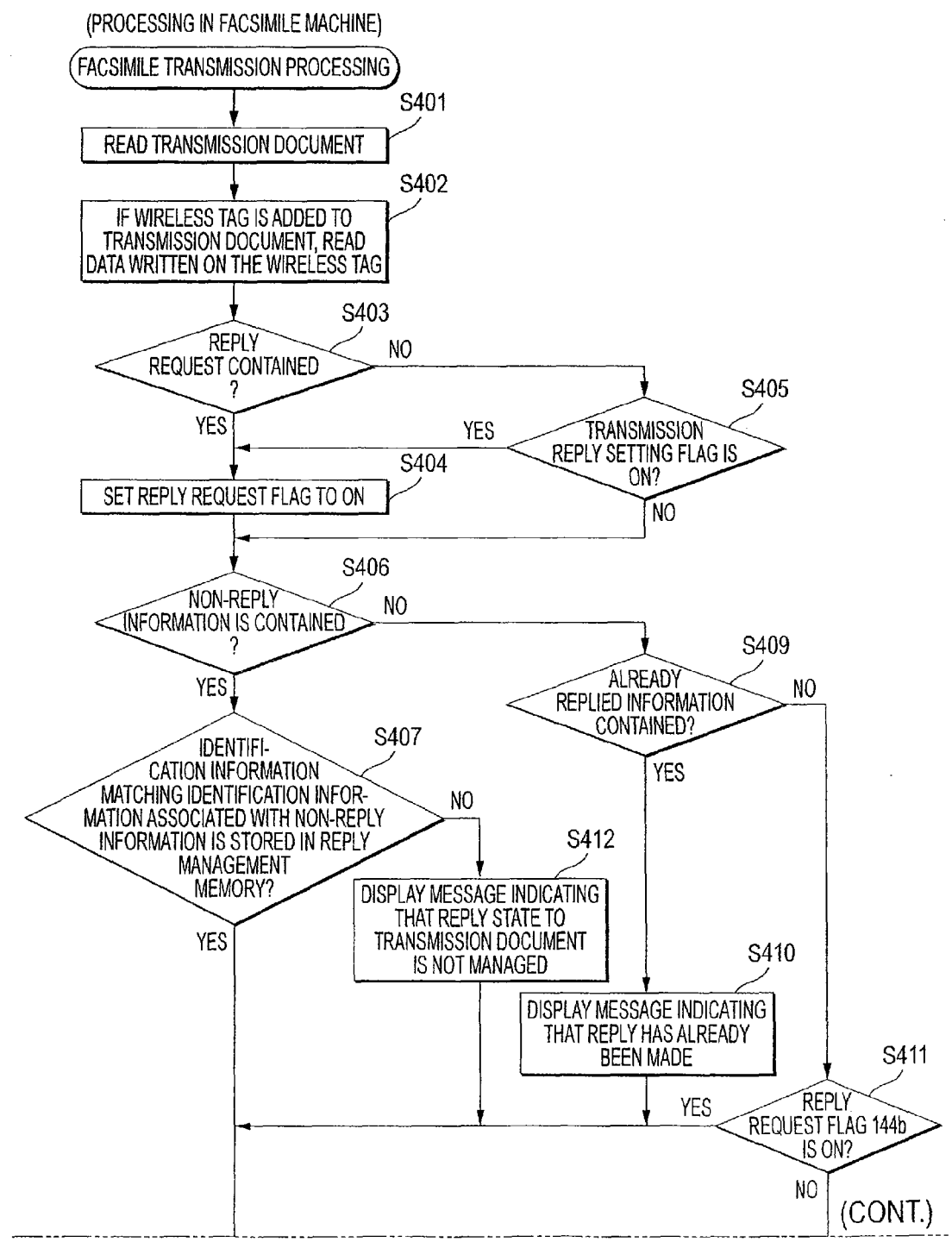
FIG. 11 is a flowchart to show facsimile transmission processing according to a second exemplary embodiment.

Next, facsimile transmission processing executed in the facsimile machine 10 will be discussed with reference to FIG. 11. FIG. 11 is a flowchart of the facsimile transmission processing according to the second exemplary embodiment. The facsimile transmission processing includes transmitting predetermined data to a destination apparatus, writing predetermined data onto a wireless tag, or storing predetermined data in reply management memory 141b in order to conduct management as to whether or not a reply request to the facsimile data to be transmitted has been made or as to whether or not reply data to previously received facsimile data has been transmitted.

In the second exemplary embodiment, the processing is executed when a user sets a document in the document insertion slot of the automatic document feeder 2 and presses the start key. If a destination needs to be specified for new transmission, the user specifies the fax number and then presses the start key.

In the processing, first a set transmission document is read through the scanner 22 (S401) and if a wireless tag 62 is added to the transmission document, the wireless tag reader 15 (e.g., an acquiring unit) reads the data written on the wireless tag 62 (S402). Then, it is determined whether or not the read data contains reply request information (e.g., reply-requested information) indicating a reply request (S403). If such reply request information is contained (e.g., when the acquiring unit acquires the reply-requested information) (YES at S403), the reply request flag 144b is set to ON (S404) and the process proceeds to S406.

On the other hand, if such reply request information is not contained (e.g., when the acquiring unit does not acquire the reply-requested information) (NO at S403), it is determined whether or not the transmission reply setting flag 142b is ON (S405). If the flag 142b is ON (e.g., when the setting unit sets the communication apparatus, such that it is necessary to reply to the transmission data) (YES at S405), the reply request flag 144b is set to ON (S404) and the process proceeds to S406. On the other hand, if the transmission reply setting flag 142b is not ON (NO at S405), S404 is skipped and the process proceeds to S406.

According to the above operations, setting can be made as to whether or not a reply request is to be sent to the destination apparatus to which the transmission document (transmission data) is to be transmitted. If reply request information is written on the wireless tag added to the transmission document (YES at S403), the reply request flag 144b is always set to ON. That is, the flag is set to ON regardless of setting of the transmission reply setting flag 142b. Accordingly, the determination as to whether or not reply request information is written on the wireless tag added to the transmission document can take precedence over the setting of the transmission reply setting flag 142b. Thus, for example, if the processing is started as the setting state of the transmission reply setting flag 142b made by a user previously using the facsimile machine is not checked, setting of the transmission document to be just now transmitted can take precedence.

At S406, it is determined whether or not the data read at S402 contains non-reply information indicating that a reply to the reception data including a reply request is not made. If the non-reply information is contained (YES at S406), it is determined whether or not identification information matching the identification information associated with the non-reply information is stored in the reply management memory 141b (S407). If the match identification information is stored (YES at S407), the process proceeds to S408.

Figure 14:
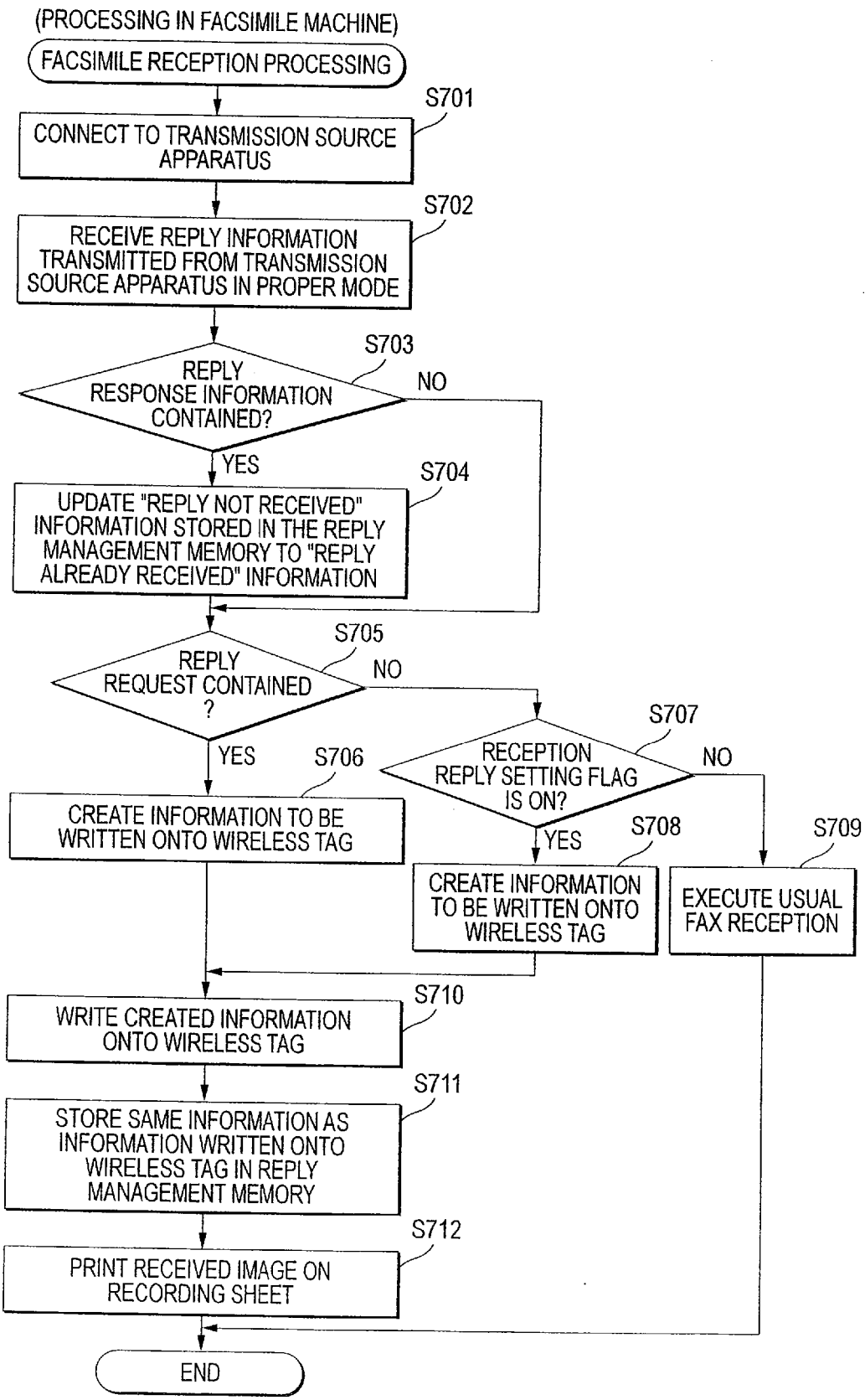
FIG. 14 is a flowchart to show facsimile reception processing according to the second exemplary embodiment.

In the facsimile reception processing described with reference to FIG. 14, if a reply request is included in facsimile data transmitted from a transmission source apparatus or if the reception reply setting flag 143b is set to ON, for example, information indicating that a reply request is included, non-reply information indicating that a reply to the reply request is not made, and identification information according to which the received facsimile data can be identified are written as reply-requested information onto the wireless tag added to the first recording sheet of the reception document with the received facsimile data printed thereon. The same information as the information written onto the wireless tag is also stored in the reply management memory 141b.

Since the wireless tag 62 on which various pieces of information are written is also used at the transmission time of reply data, for example, if a function of automatically creating a cover page for reply is included, a mode in which various pieces of information are written on the wireless tag 62 of a recording sheet on which the cover page is printed is also possible in place of the mode in which various pieces of information are written on the wireless tag 62 of a recording sheet on which reception data is printed. The cover page may be printed a predetermined image in order to determine that a recording sheet is cover page. And, the predetermined image may include that the sheet printed the predetermined image thereon is for replying data. Also, the various pieces of information may be written on the wireless tag 62 of a first page of the reception data. In this case, for a subsequent page(s), ordinary sheet to which a wireless tag is not added may be used.

Since there is a possibility that the user may forget the descriptions of reception data involving a reply request, a mode in which partial data of the top portion of reception data, etc., is also printed in a part of a cover page is also possible. Further, various pieces of information may be written onto two wireless tags of a cover page and a recording sheet with the top of reception data printed thereon.

Then, in order to transmit a reply to received facsimile data, a user sets the first recording sheet or a cover page for transmission at the top of a transmission document. When information is read from a wireless tag, non-reply information exists and further the identification information matching the identification information associated with the non-reply information is also stored in the reply management memory 141b.

If it is not determined at S407 that the match identification information is stored in the reply management memory 141b, a message indicating that the reply state to the transmission document is not managed is displayed on the LCD 55 (S412) and the process proceeds to S408.

On the other hand, at operation S6, if no non-reply information is contained (NO at S406), it is determined whether or not "already replied" information indicating that a reply has already been made exists (S409). If "already replied" information exists (YES at S409), information indicating that a reply has already been made is displayed on the LCD 55 (S410) and the process proceeds to S408.

That is, if presence of non-reply information is detected and then a transmission document (transmission data) is transmitted, the transmission data can be determined as reply data and the non-reply information is updated to "already replied" information indicating that a reply has already been made as described later. Therefore, if the wireless tag contains "already replied" information, it is seen that reply data to the recording sheet (reception document) given the wireless tag has already been transmitted.

If "already replied" information does not exist (NO at S409), whether or not the reply request flag 144*b* is ON is determined (S411) and if the flag is ON (YES at S411), the process proceeds to S408. If the reply request flag 144*b* is not ON (NO at S411), usual FAX transmission processing is executed (S420) and the facsimile transmission processing ends.

At S408, a message for requesting the user to determine whether or not data of the read transmission document is to be transmitted (returned) is displayed on the LCD 55 (S408). For example, if the transmission document is a reply to the previously received facsimile data including a reply request, the FAX number of the transmission source apparatus transmitting the received facsimile data (in this case, the FAX number of the transmission source apparatus becomes the FAX number of the destination apparatus to which a reply is to be transmitted) is stored in the reply management memory 141*b* in association with the non-reply information and the identification information described above. Thus, the FAX number of the destination apparatus is displayed and a message for requesting the user to determine whether or not a reply is to be transmitted to the destination apparatus is also displayed on the LCD 55. Accordingly, the FAX number of the destination apparatus can be acquired easily and with no mistake. For new transmission, destination information is specified before S401 and thus the FAX number is used.

Then, it is determined entry of a user in response to the display (S413). If the user determines transmission (reply) and presses a select key, for example, (YES at S413), the facsimile machine 10 is connected to the destination apparatus (S414). That is, a calling signal (CI signal) and a FAX signal (CNG signal) are transmitted to the destination apparatus and a response signal (CED signal) is received from the destination apparatus in response to the calling and FAX signals, whereby the facsimile machine 10 is connected to the destination apparatus.

When the facsimile machine 10 is connected to the destination apparatus, further the functions of the destination apparatus in a proper mode are received from the destination apparatus (S415). That is, information as to whether or not the destination apparatus has the same reply management function as the facsimile machine 10 is received through an NSF signal and a DIS signal and the reception result is determined (S416).

Figure 13:
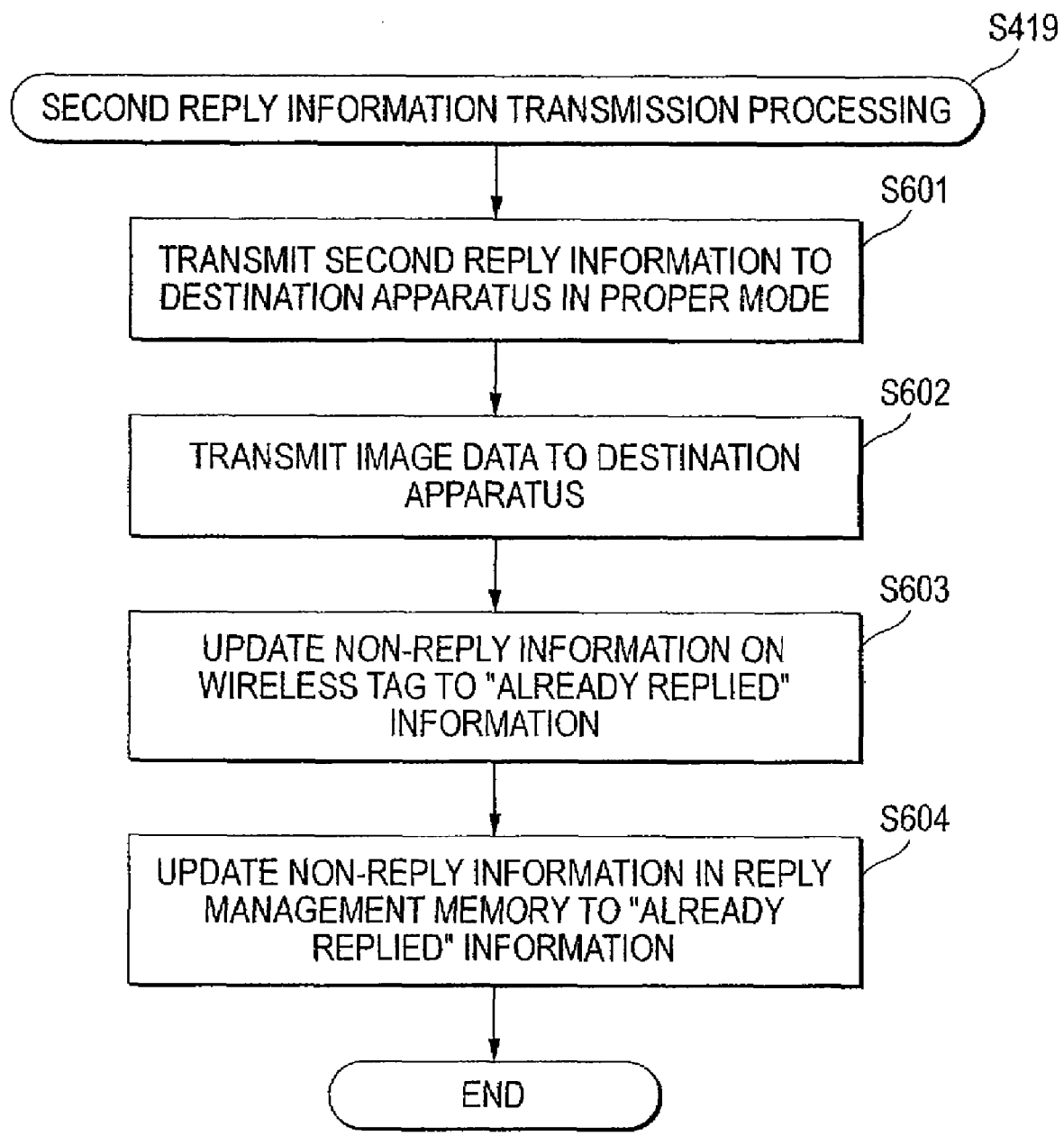
FIG. 13 is a flowchart to show second reply information transmission processing according to the second exemplary embodiment.

As a result, if the destination apparatus has the reply management function (YES at S416), it is determined whether or not the reply request flag is ON (S417). If the flag is ON (YES at S417), first reply information transmission processing later described with reference to FIG. 12 is executed (S418) and the facsimile transmission processing ends. On the other hand, if the reply request flag is not ON (NO at S417), second reply information transmission processing later described with reference to FIG. 13 is executed (S419) and the facsimile transmission processing ends.

Therefore, for example, if new transmission data is transmitted from the facsimile machine 10 to the destination apparatus and moreover a reply request to the transmission data is made (reply request flag: ON), it is considered that neither non-reply information nor "already replied" information is written on the wireless tag 62 and thus NO is returned from the determinations at S406 and S409 and YES is returned from the determination at S411. Through S408 to S416, finally YES is returned from the determination at S417 and thus the first reply information transmission processing is selected.

On the other hand, if reply data to reception data is transmitted from the facsimile machine 10 and moreover a reply request to the transmission data is not made (a reply is not requested) (reply request flag: OFF), it is considered that non-reply information is written on the wireless tag 62 as reply request information and thus YES is returned from the determinations at S406 and S407. Through S408 to S416, finally NO is returned from the determination at S417 and thus the second reply information transmission processing is selected.

At S413, if the user determines no transmission and presses a cancel key, for example, (NO at S413), the facsimile transmission processing ends. At S416, if the destination apparatus does not have the reply management function (NO at S416), usual FAX transmission processing is executed (S420) and the facsimile transmission processing ends.

Next, the first reply information transmission processing (S418) executed in the facsimile machine 10 will be discussed with reference to FIG. 12. FIG. 12 is a flowchart of the first reply information transmission processing. The first reply information transmission processing is processing of replying to previously received facsimile data and further sending a reply request to the reply to the destination apparatus.

In the processing, firstly, first reply information is transmitted to the destination apparatus in the proper mode (S501). As the first reply information, identification information stored in the reply management memory 141*b* in association with non-reply information (identification information read from the wireless tag), transmission source information indicating the FAX number of the facsimile machine 10 as the transmission source apparatus, reply response information indicating a reply, reply-requested information indicating a reply request, transmission date and time information set as new identification information for the reply-requested information, and reply time limit information indicating the reply time limit to the reply-requested information are transmitted to the destination apparatus through an NSS signal and a TSI signal.

In the processing in FIG. 11, if it is determined at S406 that non-reply information is not contained and if it is determined at S409 that no "already replied" information exists, new transmission is applied and thus the identification information stored in the reply management memory 141*b* in association with non-reply information (identification information read from the wireless tag) and the reply response information indicating a reply are not contained.

Next, the image data read from the transmission document is transmitted to the destination apparatus in accordance with a usual facsimile transmission system (S502).

The non-reply information written on the wireless tag added to the front page of the transmission document discharged to the document discharge slot of the automatic document feeder 2 is updated by the wireless tag writer 16a to "already replied" information indicating that a reply has already been made. Transmission date and time information as identification information, destination identification information indicating the FAX number of the destination, "reply not received" information indicating that no reply is received although a reply request is made, and reply time limit information indicating the time limit of the reply are associated with each other and are newly written onto the wireless tag by the wireless tag writer 16a (S503). The current date and time is acquired from the RTC 17 and the reply time limit is set in a predetermined time period preset from the current date and time.

Next, the non-reply information associated with the identification information read from the wireless tag 62, stored in the reply management memory 141b is updated to "already replied" information indicating that a reply has already been made. If a reply request is made, transmission date and time information as new identification information, destination identification information indicating the FAX number of the destination, "reply not received" information indicating that no reply is received although the reply request is made, and reply time limit information indicating the time limit of the reply are associated with each other and are stored in the reply management memory 141b (S504).

As the first reply information transmission processing is performed, transmitting of reply data to the reception data determined by the identification information read from the wireless tag 62 can be managed. Further, if a reply request to the reply data (transmission data) is made, information for managing it is newly generated in the reply management memory 141b and management as to whether or not reply data has been received from the destination can be conducted.

Next, the second reply information transmission processing (S419) executed in the facsimile machine 10 will be discussed with reference to FIG. 13. FIG. 13 is a flowchart of the second reply information transmission processing. The second reply information transmission processing is processing of transmitting reply data to previously received facsimile data.

In the processing, firstly, second reply information is transmitted to the destination apparatus in the proper mode (S601). As the second reply information, identification information stored in the reply management memory 141b in association with non-reply information (identification information read from the wireless tag), the FAX number of the facsimile machine 10 as the transmission source apparatus, and reply response information indicating a reply are transmitted to the destination apparatus through an NSS signal and a TSI signal.

Next, the image data read from the transmission document is transmitted to the destination apparatus in accordance with the usual facsimile transmission system (S602).

The non-reply information written on the wireless tag added to the front page of the transmission document discharged to the document discharge slot of the automatic document feeder 2 is updated by the wireless tag writer 16a to "already replied" information indicating that a reply has already been made (S603).

Next, the non-reply information associated with the identification information read from the wireless tag 62, stored in the reply management memory 141b is updated to "already replied" information indicating that a reply has already been made.

As the second reply information transmission processing is performed, management as to whether or not reply data to the previously received facsimile data has been transmitted can be conducted.

Next, the facsimile reception processing executed in the facsimile machine 10 will be discussed with reference to FIG. 14. FIG. 14 is a flowchart of the facsimile reception processing. The facsimile reception processing is processing of writing predetermined information onto a wireless tag or storing predetermined information in the reply management memory 141b to conduct management as to whether or not a reply request to the facsimile data received from a transmission source apparatus is to be made and conduct management as to whether or not a reply to the previously transmitted facsimile data has been received.

In the processing, firstly, the facsimile machine 10 is connected to a transmission source apparatus (S701) and reply information transmitted from the associated apparatus in the proper mode is acquired (S702). The reply information mentioned here corresponds to the first reply information or the second reply information previously described with reference to FIG. 12 or 13.

Then, it is determined whether or not the reply information contains reply response information (S703). In the second exemplary embodiment, as the first reply information, not only the reply response information, but also the identification information stored in the reply management memory 141b of the transmission source apparatus in association with non-reply information (identification information read from the wireless tag) is transmitted from the transmission source apparatus and thus whether or not the identification information matching the identification information is stored in the reply management memory 141b of the facsimile machine 10 may be determined, thereby determining whether or not the received facsimile data is a reply. Accordingly, the reply response information need not be transmitted as the first reply information.

As a result of the determination, if reply response information is contained (YES at S703), the identification information matching the identification information received together with the reply response information is extracted as a part of the reply information and "reply not received" information stored in the reply management memory 141b in association with the identification information is updated to "reply already received" information indicating that reply data has already been received (S704). If reply response information is not contained (NO at S703), S704 is skipped.

Next, it is determined whether or not the reply information received at S702 contains reply request information (S705) and if reply request information is contained (YES at S705), information to be written onto a wireless tag added to a recording sheet for first recording an image of received facsimile data is created based on the reply information (S706).

As the wireless tag on which the reply information is written, a cover page for a reply may be created and the reply information may be written onto a wireless tag of the cover page as mentioned above.

Specifically, the generated information contains transmission date and time information as identification information of the reception data, transmission source identification information indicating the FAX number of the transmission source apparatus, non-reply information indicating that a reply to the received FAX is not made, and the time limit of the reply.

On the other hand, if reply request information is not contained (NO at S705), it is determined whether or not the reception reply setting flag 143b is ON (S707). If the flag is ON (YES at S707), information to be written onto a wireless tag added to a first recording sheet for recording an image of received facsimile data is created based on the reply information (S708).

Specifically, the generated information contains reception date and time information as identification information, transmission source identification information indicating the FAX number of the transmission source apparatus, non-reply information indicating that a reply to the received FAX is not made, and the time limit of the reply.

If the reception reply setting flag 143b is not ON (NO at S707), usual FAX reception processing is executed (S709) and the facsimile reception processing ends.

The information created at S706 or S708 is written onto the wireless tag (S710), the same information as the information written onto the wireless tag is stored in the reply management memory 141b (S711), a received image is printed on a recording sheet (S712), and the facsimile reception processing ends.

According to the above processing, management as to whether or not a reply request to the facsimile data received from the transmission source apparatus is to be made or management as to whether or not reply data to the previously transmitted facsimile data has been received can be conducted.

Next, reply management lists according to the second exemplary embodiment displayed on the LCD 55 shown in FIGS. 15A to 15C will be discussed. The reply management lists are lists displayed on the LCD 55 according to the reply management listing program 122b.

FIG. 15A shows a reply management list 100 for reception. The list is a display for a user to check whether or not a reply to received facsimile data is complete. For example, if the user selects an item of the reply management list for reception out of a menu screen displayed on the LCD 55, the corresponding information stored in the reply management memory 141b is extracted and is displayed on the LCD 55.

The list is partitioned into a reception date column 101, a transmission source column 102, and a reply information column 103 in order from the left. The reception date column 101 displays the reception dates and times of facsimile data received within a predetermined time period from the top to the bottom in the reception order. The transmission source column 102 displays the FAX numbers of the transmission source apparatus. The reply information column 103 displays the reply state.

The reply management list 100 for reception is displayed on the LCD 55, whereby, for example, a user can see at a glance that the time limit of a reply to the facsimile data received from the transmission source apparatus "1234567890" at "2007/3/3 15:11" is "2007/3/8 15:11 deadline," that a reply to the facsimile data received from the transmission source apparatus "1234567890" at "2007/3/4 20:32" is "already made," and that a reply to the facsimile data received from the transmission source apparatus "2345678901" at "2007/3/6 11:00" is "not made."

FIG. 15B shows an expired reply management list 200. The list is a display for the user to check expired facsimile data (received facsimile data or replied facsimile data); for example, the corresponding information stored in the reply management memory 141b is extracted at regular time intervals and is displayed on the LCD 55.

The list is partitioned into a reception date/transmission date column 201, a transmission source/destination column 202, and a reply information column 203 in order from the left. The reception date/transmission date column 201 displays the reception date or the transmission date of expired facsimile data. The transmission source/destination column 202 displays the FAX number of the transmission source apparatus or the FAX number of the destination apparatus. The reply information column 203 displays the expiration date.

The expired reply management list 200 is displayed on the LCD 55, whereby, for example, the user can grasp at a glance that the time limit of a reply to the facsimile data received from the transmission source apparatus "1234567890" at "2007/2/3 15:11" is exceeded.

FIG. 15C shows a reply management list 300 for transmission. The list is a display for the user to check whether or not a reply to transmitted facsimile data has been received. For example, if the user selects an item of the reply management list for transmission out of a menu screen displayed on the LCD 55, the corresponding information stored in the reply management memory 141b is extracted and is displayed on the LCD 55.

The list is partitioned into a transmission date column 301, a destination column 302, and a reply information column 303 in order from the left. The transmission date column 301 displays the transmission dates and times of facsimile data transmitted within a predetermined time period from the top to the bottom in the transmission order. The destination column 302 displays the FAX numbers of the destination apparatus. The reply information column 303 displays the reply state.

The reply management list 300 for transmission is displayed on the LCD 55, whereby, for example, the user can see at a glance that the time limit of a reply to the facsimile data transmitted to the destination apparatus with the FAX number "1234567890" at "2007/3/1 15:11" is "2007/3/8 15:11 deadline," that a reply to the facsimile data transmitted to the destination apparatus with the FAX number "1234567890" at "2007/3/2 20:32" is "wait for reply," and that a reply to the facsimile data transmitted to the destination apparatus with the FAX number "2345678901" at "2007/3/3 11:00" is "already received."

Similar information of reply-requested information (non-reply information) indicating a reply to reception data is requested, source information, transmission date and time information, etc., is also written on the wireless tag added to the recording sheet (reception document) printing the reception data. Thus, the wireless tag is read, whereby the information concerning the reception document can also be displayed on the LCD 55 so that it is used for the user to check whether or not reply data has been transmitted.

Likewise, destination information, information indicating that a reply request has been sent, information ("reply not received" information) as to whether or not replay data has been received, etc., is also written on the wireless tag of the transmission document. Thus, the wireless tag is read, whereby the information concerning the transmission document can also be displayed on the LCD 55 so that it is used for the user to check whether or not reply data has been received.

While the present invention has been shown and described with reference to the second exemplary embodiment thereof, it will be understood by those skilled in the art that various changes in form and details may be made therein without departing from the spirit and scope of the invention as defined by the appended claims.

In the description of the second exemplary embodiment, the wireless tag on which various pieces of information are written as described above is written on the first one of recording sheets on which an image of received facsimile data is printed. However, the wireless tag on which information is written is not limited to the first recording sheet and may be added to an intermediate recording sheet or may be added to a dedicated recording sheet which is separately provided.

In the description of the second exemplary embodiment, the information indicating the reception date and time of received facsimile data and the information indicating the transmission date and time of transmitted facsimile data are used as identification information for identifying the received facsimile data and that for identifying the transmitted facsimile data. However, the identification information for identifying the received facsimile data and that for identifying the transmitted facsimile data are not limited to the reception date and time or the transmission date and time; for example, serial numbers may be assigned in order.

For example, the facsimile machine 10 of the second exemplary embodiment described above contains the wireless tag reader 15, the wireless tag writers 16a and 16b, the scanner 22, and the laser printer 30 all as internal components, but the components may be external components connected to the facsimile machine 10 through a cable, etc.

In the description of the facsimile machine 10 of the second exemplary embodiment, the image data of the document 61 is read through the automatic document feeder 2, but the inventive concept of the present invention can also be applied to a facsimile machine for reading image data using a flat bed system, of course.

In the description of the second exemplary embodiment, the reply management lists are displayed on the LCD 55. However, the reply management lists are printed on a recording sheet by the printer unit 4.

In the description of the first and second exemplary embodiments, the facsimile machine 1 (10) transmits and receives data through the telephone line 32. However, the present invention is not limited thereto. For example, the facsimile machine 1 (10) may transmit and receive data with using a local area network (LAN) or may transmit and receive data wirelessly. In this case, in order to identify the destination apparatus, IP address or email address may be used instead of FAX numbers.

What is claimed is:

1. A communication apparatus comprising:
   a receiving unit which receives reception data transmitted from an external apparatus;
   acquiring unit which acquires identification information for identifying the external apparatus which transmits the reception data;
   a printing unit which prints an image on a recording medium based on the reception data; and
   a tag writer which wirelessly writes reply-requested information indicating that a reply to the reception data is requested at the external device into a wireless tag added to the recording medium and which wirelessly writes the identification information for identifying the external apparatus different from the reply-requested information into the wireless tag.

2. The communication apparatus according to claim 1, further comprising a setting unit which sets whether the tag writer writes the reply-requested information into the wireless tag before the receiving unit receives reception data transmitted from the external apparatus.

3. The communication apparatus according to claim 1, wherein the tag writer writes the reply-requested information into the wireless tag, when the reception data comprises information indicating that a reply to the reception data is requested.

4. The communication apparatus according to claim 1, wherein the reply-requested information comprises non-reply information indicating that a reply to the reception data has not been transmitted,
   the communication apparatus further comprising:
      a transmitting unit which transmits transmission data;
      a reply determining unit which determines whether transmission data to be transmitted by the transmitting unit comprises the reply to the reception data; and
      an updating unit which updates the non-reply information to replied information indicating that the reply to the reception data has been transmitted when the reply determining unit determines that the transmission data to be transmitted comprises the reply to the reception data and the transmitting unit transmits the reply to the reception data.

5. The communication apparatus according to claim 4, further comprising a tag reader which reads data stored in the wireless tag,
   wherein, when the tag data read by the tag reader comprises the reply-requested information and when data exists which is associated with the reading of the reply-requested information and which is to be transmitted by the transmitting unit, the reply determining unit determines that the data comprises the reply.

6. The communication apparatus according to claim 4, further comprising a confirming unit which confirms whether the reply to the reception data is to be transmitted,
   wherein, when the confirming unit confirms that the reply to the reception data is to be transmitted, the reply determining unit determines that data associated with the confirmation that the reply to the reception data is to be transmitted comprises the reply.

7. The communication apparatus according to claim 4, wherein the tag writer writes the identification information and the reply-requested information into the wireless tag so as to be associated with each other, and
   wherein the transmitting unit transmits the transmission data comprising the reply to the reception data to an external apparatus identified by the identification information.

8. The communication apparatus according to claim 1, further comprising a reception time acquiring unit which acquires a reception time at which the receiving unit receives the reception data,
   wherein the tag writer writes the reception time into the wireless tag so as to be associated with the reply-requested information.

9. The communication apparatus according to claim 8, further comprising:
   a tag reader which wirelessly reads data from the wireless tag;
   a limit setting unit which sets a reply time limit for replying to the reception data based on the reception time read by the tag reader;
   a current time acquiring unit which acquires a current time;
   a reply limit determining unit which determines whether the acquired current time is later than the set reply time limit; and
   a first output unit which, when the reply limit determining unit determines that the acquired current time exceeds the set reply time limit, outputs information indicating that the acquired current time is later than the set reply time limit.

10. The communication apparatus according to claim 1, further comprising:
a tag reader which wirelessly reads data from the wireless tag; and
an output unit which outputs data stored in the wireless tag and read by the tag reader.

11. The communication apparatus according to claim 1, wherein the tag writer writes the reply-requested information into the wireless tag which is added to a recording medium on which a first page of the reception data is printed by the printing unit.

12. The communication apparatus according to claim 1, wherein the reply-requested information comprises data identification information for identifying the reception data and non-reply information indicating that a reply to the reception data has not been transmitted,
wherein the tag writer writes the data identification information and the non-reply information into the wireless tag so as to be associated with each other, as the reply-requested information,
the communication apparatus further comprising:
a reply management unit which stores, in a storage unit, the data identification information and the non-reply information which are written into the wireless tag;
a transmitting unit which transmits transmission data;
a tag reader which reads data stored in the wireless tag;
a receiving data determining unit which determines whether data read by the tag reader comprises data identification information matching the data identification information stored in the storage unit;
a reply determining unit which determines that data to be transmitted by the transmitting unit in association with the data identification information comprises a reply to data identified by the data identification information when the receiving data determining unit determines that the data read by the tag reader comprises the data identification information matching the data identification information stored in the storage unit;
an updating unit which updates the non-reply information associated with the data identification information stored in one or more of the wireless tag and the storage unit to replied information indicating that the reply to the reception data has been transmitted by the one or more of the tag writer and the reply management unit, when the transmitting unit transmits the reply to the external apparatus.

13. The communication apparatus according to claim 12, wherein at least the reply management unit stores the reply-requested information and the identification information different from the reply-requested information in the storage unit, such that the reply-requested information and the identification information different from the reply-requested information are associated with each other, or the tag writer writes the reply-requested information and the identification information different from the reply-requested information in the wireless tag, such that the reply-requested information and the identification information different from the reply-requested information are associated with each other, information and the reply requested information so as to be associated with each other, and
wherein the transmitting unit transmits the transmission data to an external apparatus identified by the identification information at least stored in the storage unit or written in the wireless tag.

14. The communication apparatus according to claim 12, wherein, when the transmitting unit transmits the transmission data comprising the reply, the transmitting unit further transmits the data identification information and reply response information indicating that the transmission data is in reply to data identified by the data identification information.

15. The communication apparatus according to claim 12, further comprising a confirming unit which confirms whether the reply to the reception data is to be transmitted when the receiving data determining unit determines that the data read by the wireless tag reader comprises the matching data identification information stored in the storage unit,
wherein, when the confirming unit confirms that the reply to the reception data is to be transmitted, the reply determining unit determines data associated with the confirmation that the reply to the reception data is to be transmitted comprises the reply.

16. The communication apparatus according to claim 12, further comprising a first outputting unit which outputs one or more of data stored in the storage unit and data written in a wireless tag.

17. The communication apparatus according to claim 12, further comprising a reception time acquiring unit which acquires a reception time at which the receiving unit receives the reception data,
wherein at least the reply management unit stores in the storage unit or the tag writer writes in the wireless tag, the reception time as the data identification information so as to be associated with the reply-requested information.

18. The communication apparatus according to claim 17, further comprising:
a limit setting unit which sets a reply time limit for replying to the reception data based on the reception time stored in the storage unit or read from the wireless tag;
a current time acquiring unit which acquires a current time;
an extracting unit which extracts data identification information, of which the acquired current time is later than the corresponding reply time limit, and which is associated with the non-reply information; and
an outputting unit which outputs at least the extracted data identification information.

19. A communication apparatus comprising:
an image reading unit which reads image data formed on a recording medium;
a destination acquiring unit which acquires identification information for identifying an external apparatus as a transmission destination;
a transmitting unit which transmits a transmission data comprising the image data read by the image reading unit to the external apparatus identified by the identification information;
an acquiring unit which acquires reply-requested information indicating that a reply to the transmission data is necessary, from a wireless tag added to the recording medium, wherein the reply-requested information is different from the identification information;
a reply management unit which stores, in a storage unit, data identification information for identifying the transmission data and reply-not-received information so as to be associated with each other, the reply-not-received information indicating that a reply to the transmission data identified by the identification information has not been received; and
a transmission controller which controls the transmitting unit to transmit the data identifying information and the reply-requested information while being associated with the transmission data to the external apparatus.

20. The communication apparatus according to claim 19, further comprising a setting unit which configured to set the communication apparatus, such that it is necessary for the communication apparatus to reply to the transmission data,
wherein, when the acquiring unit acquires the reply-requested information, the reply management unit stores the reply-requested information regardless of a setting of the setting unit, and
wherein, when the acquiring unit does not acquire the reply-requested information and when the setting unit sets the communication apparatus, such that it is necessary to reply to the transmission data, the reply management units stores the data identification information and the reply-requested information in the storage unit so as to be associated with each other.

21. The communication apparatus according to claim 19, further comprising a tag writer which writes the data identification information and the reply-requested information so as to be associated with each other into the wireless tag added to the recording medium when the acquiring unit acquires the reply-requested information.

22. The communication apparatus according to claim 19, further comprising:
a tag reader which reads data from a wireless tag; and
an outputting unit which outputs one or more of data stored in the storage unit by the reply management unit and data read by the tag reader from the wireless tag.

23. The communication apparatus according to claim 19, further comprising a transmission time acquiring unit which acquires a transmission time at which the transmitting unit transmits the transmission data,
wherein at least the reply management unit stores in the storage unit or the tag writer writes into the wireless tag, the acquired transmission time as the data identification information and the reply-requested information so as to be associated with each other.

24. The communication apparatus according to claim 19, wherein the transmission controller controls the transmitting unit to transmit identification information for identifying the communication apparatus, the transmission data, the data identification information and the reply-requested information so as to be associated with one another.

25. The communication apparatus according to claim 23, further comprising:
a tag reader which wirelessly reads data from the wireless tag;
a limit setting unit which sets a reply time limit for replying the transmission data based on the transmission time read by the tag reader;
a current time acquiring unit which acquires a current time;
an extracting unit which extracts data identification information, of which the acquired current time is later than the corresponding reply time limit, and which is associated with the reply-not-received information; and
an outputting unit which outputs at least the extracted data identification information.

26. The communication apparatus according to claim 19, further comprising:
a receiving unit which receives reception data;
a receiving data determining unit which determines whether the reception data comprises the reply to the transmission data;
an updating unit which updates the reply-not-received information of the transmission data stored in one or more of the wireless tag and the storage unit to replied information indicating that the reply to the transmission data has been transmitted by one or more of the tag writer and the reply management unit, when the receiving data determining unit determines that the reception data comprises the reply to the transmission data.

* * * * *